United States Patent
Sandvick

(10) Patent No.: US 12,062,265 B2
(45) Date of Patent: *Aug. 13, 2024

(54) COMPUTER ACTIVATED INSTANT WINNER LOTTERY TICKET GAME SYSTEM AND METHOD

(71) Applicant: Frederick Sandvick, Las Vegas, NV (US)

(72) Inventor: Frederick Sandvick, Las Vegas, NV (US)

( * ) Notice: Subject to any disclaimer, the term of this patent is extended or adjusted under 35 U.S.C. 154(b) by 378 days.

This patent is subject to a terminal disclaimer.

(21) Appl. No.: 17/326,304

(22) Filed: May 20, 2021

(65) Prior Publication Data

US 2021/0272416 A1   Sep. 2, 2021

Related U.S. Application Data

(60) Continuation-in-part of application No. 16/430,352, filed on Jun. 3, 2019, now Pat. No. 11,043,079, which is a continuation-in-part of application No. 15/330,342, filed on Sep. 8, 2016, now Pat. No. 10,354,495, which is a division of application No. 14/216,520, filed on Mar. 17, 2014, now Pat. No. 9,443,397.

(60) Provisional application No. 61/791,910, filed on Mar. 15, 2013.

(51) Int. Cl.
| | |
|---|---|
| *A63F 9/24* | (2006.01) |
| *G06Q 50/34* | (2012.01) |
| *G07F 17/32* | (2006.01) |

(52) U.S. Cl.
CPC ............ *G07F 17/329* (2013.01); *G06Q 50/34* (2013.01); *G07F 17/3211* (2013.01); *G07F 17/3225* (2013.01); *G07F 17/3241* (2013.01); *G07F 17/3248* (2013.01); *G07F 17/3258* (2013.01)

(58) Field of Classification Search
None
See application file for complete search history.

(56) References Cited

U.S. PATENT DOCUMENTS

| | | | | |
|---|---|---|---|---|
| 6,210,276 | B1 * | 4/2001 | Mullins | A63F 3/00157 463/17 |
| 7,204,756 | B2 * | 4/2007 | Jubinville | G07F 17/32 463/25 |
| 8,118,659 | B2 * | 2/2012 | Wright | G07F 17/32 463/19 |
| 8,398,484 | B2 * | 3/2013 | Wright | G07F 17/42 463/28 |
| 8,672,325 | B2 * | 3/2014 | Green | A63F 3/065 273/138.1 |
| 2003/0045340 | A1 * | 3/2003 | Roberts | A63F 3/0665 463/17 |
| 2006/0100008 | A1 * | 5/2006 | Wright | G07F 17/3258 463/17 |
| 2006/0258433 | A1 * | 11/2006 | Finocchio | A63F 3/062 463/43 |

* cited by examiner

*Primary Examiner* — Sunit Pandya
(74) *Attorney, Agent, or Firm* — The Thornton Firm, LLC

(57) ABSTRACT

A computer activated system and method for selling pre-printed instant-winner lottery tickets, or digital simulation games, by use of a central computer communicating with widely-distributed terminals (including mobile devices and PCs), with each ticket providing a traditional instant-winner game with a chance for an added instant winner progressive jackpot and/or non-pre-designated fixed jackpot prize and/or the display of the simulation of such game on a terminal in conjunction with the optional display of advertising, and/or advertisers' images, and/or promotional offerings. The identification code printed on each ticket is read by a code reader, after the ticket has been issued from a vending machine, a clerk-assisted terminal, a digitally displayed terminal, or selected from an accessible display of inactive tickets, and the computer determines whether the ticket is a winner, and notifies the terminal at which the ticket is processed of the win or loss.

20 Claims, 7 Drawing Sheets

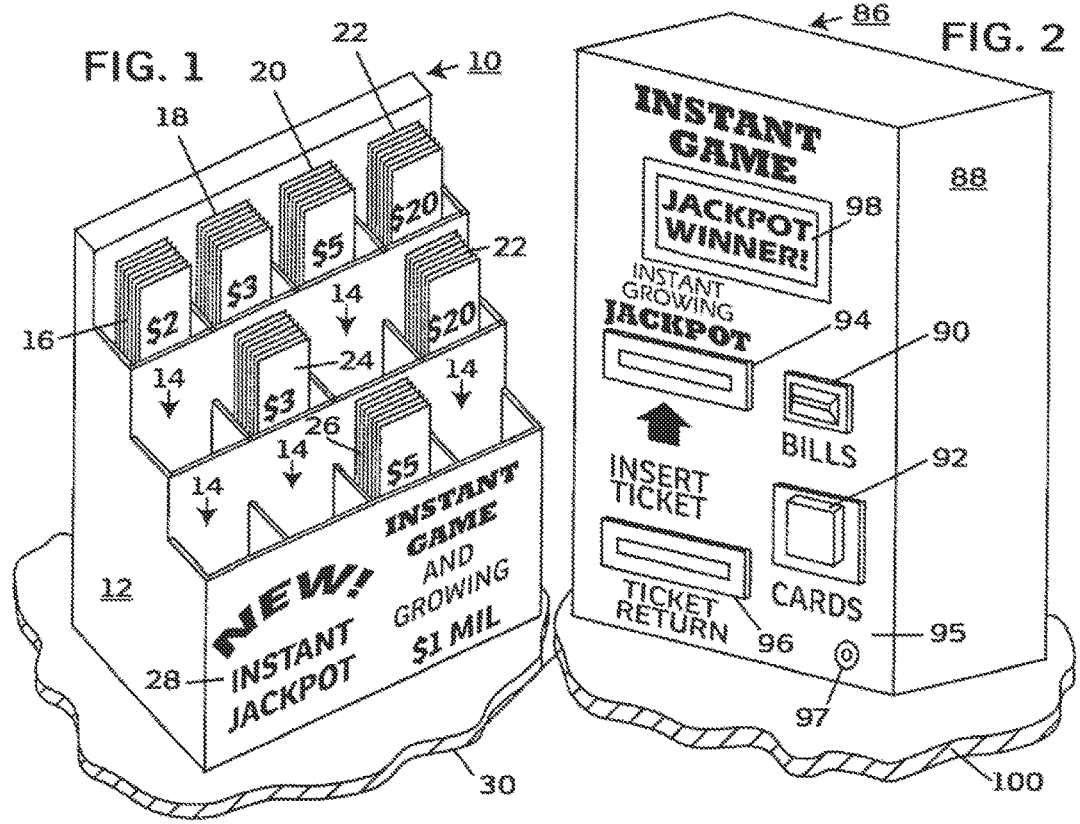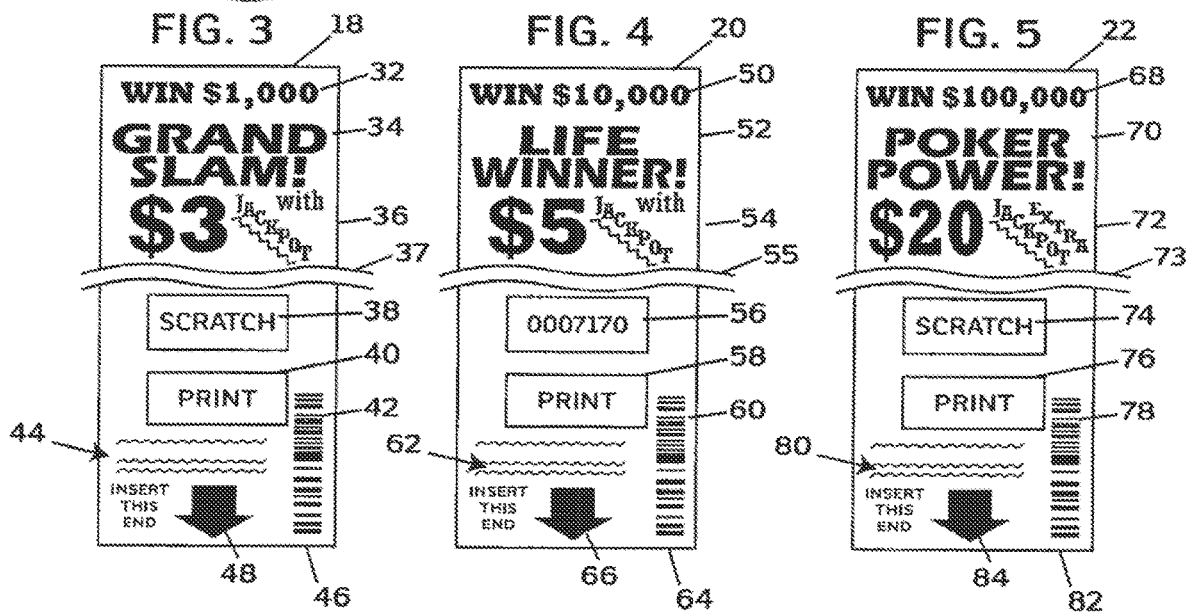

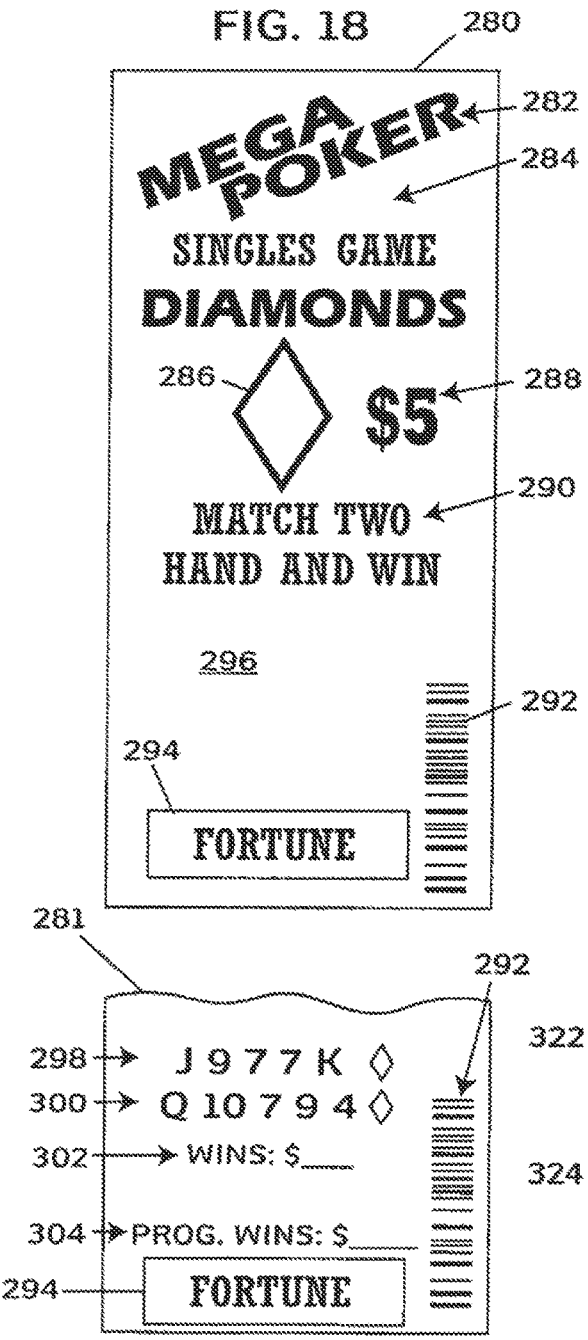
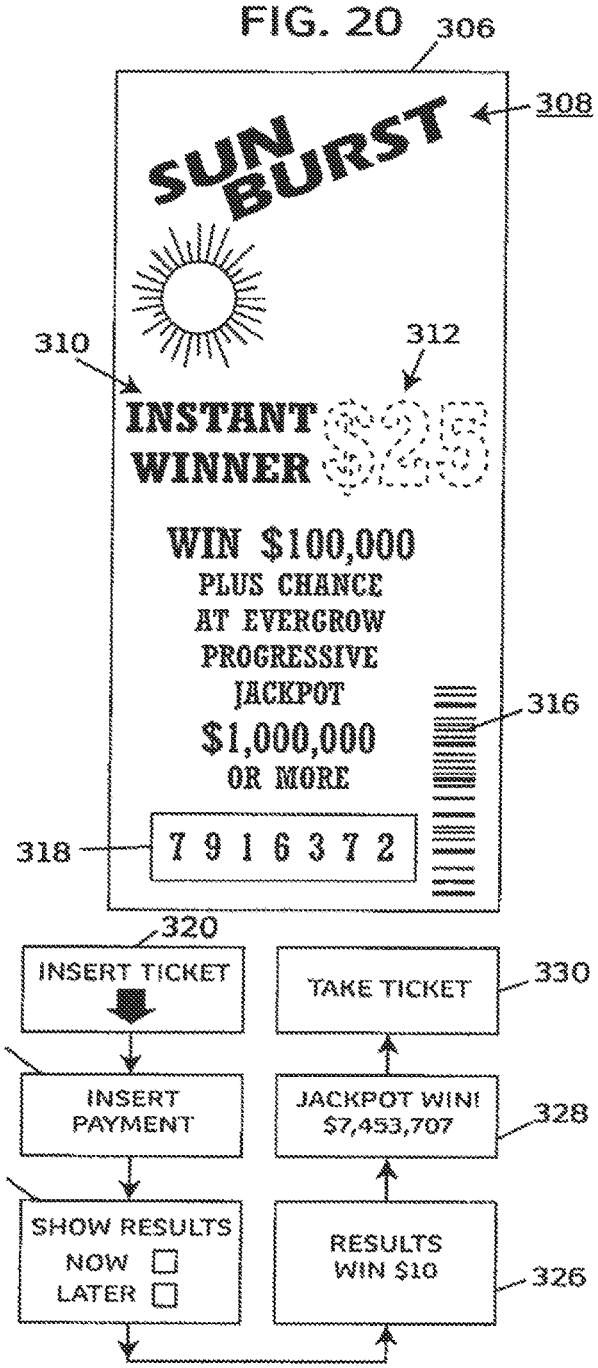

COMPUTER ACTIVATED INSTANT WINNER LOTTERY TICKET GAME SYSTEM AND METHOD

CROSS-REFERENCE TO RELATED APPLICATIONS

The present continuation-in-part patent application claims priority benefit of the U.S. nonprovisional application for patent Ser. No. 16/430,352 titled "Computer Activated Instant Winner Lottery Ticket Game System and Method" filed on Jun. 3, 2019 under 35 U.S.C. 120. The contents of this related application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

This invention relates to instant-winner lottery games and systems and methods for implementing such games.

2. Description of the Related Art

Currently, almost all instant-winner lottery tickets are sold "over-the-counter" (i.e., clerk assisted in retail locations) and through vending machines (i.e., clerk assisted dispensing machines and self-service dispensing machines). In both cases, the instant-winner lottery tickets at the retail locations or in the vending machines are "completed" and "activated" lottery tickets. "Completed" for purposes of those tickets means that all of the play data necessary to determine if the ticket is a winner or loser is pre-printed on the ticket when the ticket is originally created. The play data is generally covered by a scratch-off material to conceal the result until the ticket is purchased and the scratch-off material is removed. "Activated" for purposes of those tickets means that the ticket is a live ticket and ready for sale in the particular lottery's system so that the system has stored information as to whether the ticket is a winner or loser, and the amount of any win. These types of tickets are referred to as traditional instant-winner lottery tickets.

In effect, the completed and activated traditional instant-winner lottery ticket is a "bearer instrument" which can be cashed by anyone who holds it. Therefore, it is a prime candidate to be stolen.

Years ago, traditional instant-winner lottery tickets were activated at time of printing in a highly secure printing facility. Over the years, lotteries have implemented extensive tracking and activation programs for these traditional instant-winner lottery tickets so instead of the tickets being required to be activated at time of printing, they could be activated as reasonably close to the sale process as possible to minimize risk of theft and pilferage as well as provide better inventory tracking. Some programs even provide the option to activate the tickets just before they are put into counter displays or instant ticket vending machines where they are offered for sale. The activation process is performed in "batches" where the ticket itself is not individually activated and scanned, but rather a "batch" of tickets is activated by scanning the bar code on the outside of the ticket batch and communicating that information to an off-site host computer system.

Even though the activation process for traditional instant-winner lottery tickets is performed by a host computer and as close to the sale process as possible, all of these traditional instant-winner lottery tickets are still activated prior to sale. Further, all of the traditional instant-winner lottery tickets have completed play data so no further information is required subsequent to purchase in order to determine the outcome of the game.

As described herein, there are a number of limitations and issues associated with the traditional instant-winner lottery tickets and the systems used today, as well as limitations and issues with previously published designs and systems for non-completed instant-winner lottery tickets, including limitations on size of jackpots, limitations on game features, limitations on comprehensiveness of systems, administrative costs and burdens, limitations on self-vending, and theft and pilferage.

As mentioned, one of the major problems with traditional instant-winner lottery tickets is theft, and instant ticket vending machines were developed to minimize the risk of theft. However, a problem in the sale of traditional instant-winner lottery tickets in vending machines is that the machines usually are large and robust so as to thwart break-ins. Also, they are relatively complex to enable them to dispense multiple games. This is because up to 24 different types of game tickets are stored in the machine at any one time and up to 24 sets of dispensing equipment must be provided to dispense them. This means that the machines are costly to make and maintain. It also means that their use usually is restricted to high-traffic sites.

In order to reduce the chances of theft of such vulnerable tickets, it has been previously suggested to use instead "non-completed" lottery tickets. A non-completed ticket, as described in prior publications, is one that has only part of the play data preprinted on it and must have additional play data printed onto the ticket to compare to the first pre-printed play data to determine if it is a winner or loser. The suggested process involves scanning the non-completed instant ticket at a lottery terminal or instant ticket vending machine at a point of purchase. The terminal or vending machine would be connected to an offsite host computer that would receive the information read from the ticket and send back the completed play data. That data then would be printed on the lottery ticket. The customer could then determine whether the lottery ticket was a winner or loser by comparing the completed play data with the pre-printed partially completed play data for a "match." Ultimately, it is believed, the suggested system was never commercially implemented.

A similar system which was used commercially for a short time used draw-type lottery terminals (e.g. terminals used to sell "Lotto" tickets) to print play data needed to complete the pre-printed ticket on a separate slip of paper, referred to as the second game piece, instead of directly on the pre-printed ticket. The customer then would determine whether the pre-printed ticket was a winner or loser by comparing the completed play data on the second game piece with the partially completed play data on the pre-printed ticket. The second game piece and not the original ticket was then used as the confirmation receipt for claiming any prizes won. Other than the printing of the second set of play data on a second piece of paper rather than pre-printed the ticket itself, the system was very similar to others previously suggested.

One problem with the latter system is that the non-completed ticket must be handled at the terminal by a retail employee who must be paid, thus generating extra operating costs. Further, often only one draw-type lottery terminal is available at a given retail location, thus restricting the customers' access to that terminal. Such a restriction may inhibit the growth of instant-winner lottery ticket sales, which generally involve impulse purchases that need high visibility and convenience to maximize sales.

Another problem associated with the previous suggested non-completed ticket systems is the inflexibility of the systems and the lack of additional excitement for the players. Such previous systems required the use of tickets with only part of the play data pre-printed which limits game design. Further, each system was limited on the type of jackpots that could be provided to the players.

Progressive jackpot systems and methods have been proposed for use and used in the past in various non-instant-winner lottery gaming systems and proposed for use in certain processes of traditional instant-winner games, but believed to never have been commercially used due to a variety of problems with such proposals.

In a progressive jackpot system, a jackpot grows progressively with sales until one wins the jackpot, then another lower amount is generally provided to start a new jackpot. Often, a "shadow" jackpot is developed simultaneously with ticket sales so that an amount related to the first jackpot will be available to replace the first jackpot when it is won.

Another prior proposal suggests scanning each ticket during the process of dispensing the ticket from a vending machine, and then determining jackpot winnings. Applicant has recognized that this proposal is extremely expensive and subject to irremediable failure and does not provide for making non-activated tickets available to customers, without a dispensing machine.

Some prior proposals have suggested giving the ticket buyer an automatic entry into a draw-type lottery jackpot to be drawn at some future date. The applicant herein has recognized that this proposed gaming system lacks the excitement of an instant-winner progressive jackpot. Furthermore, in the typical draw-type jackpot drawing, many other lottery ticket buyers typically will compete for the jackpot prize, thus diluting the instant ticket buyers' chances of winning.

In another prior system, a draw-lottery type terminal has been proposed for offering instant-winning games, together with progressive jackpot games. It has been proposed to print out the results of the instant game and the jackpot on ordinary draw-lottery type receipts, that is, on ordinary paper slips.

Applicant has recognized that this proposal is seriously deficient, in that it eliminates the opportunity for the customer to choose among many different games displayed on pre-printed tickets, and thus participate directly in the playing of the game by visual selection, and eliminates or reduces the attraction which can generate impulse purchases.

As previously mentioned, theft and administration are serious concerns for lotteries, and the security process for traditional instant-winner lottery tickets continues to be costly, labor intensive, administratively cumbersome, and not fool-proof.

The comprehensive system of this invention is believed to solve or alleviate the limitations found in the prior proposals while virtually eliminating the issues of theft and the need for cumbersome and administratively burdensome tracking systems because tickets can be made to be virtually worthless until purchased.

There is constant pressure on lotteries to deploy innovative instant-winner lottery ticket games to keep players excited and playing. The comprehensive system of this invention can give designers greater freedom to create innovative new interactive game designs for lotteries.

There is constant pressure on lotteries to create "large" theoretically unlimited prize amounts (such as those prize amounts found with Powerball and Mega Millions), which are difficult if not impossible to create with pre-set prize amounts in batched traditional instant-winner lottery tickets.

Unlike the prior methods proposed for progressive jackpots, the system of this invention can greatly improve the prize structures the lotteries can set for instant-winner lottery tickets and make commercially possible a new methodology for a progressive jackpot game for instant-winner lottery tickets. Further, even though a multi-lottery jurisdiction system for a progressive jackpot for traditional instant-winner lottery tickets was previously proposed, the methodology for such a system is believed to be commercially impractical. The comprehensive system of this invention is believed to make possible a multi-lottery jurisdiction progressive jackpot game, with prize amounts that could theoretically rival that of Powerball or Mega Millions, depending on the size of the customer base, while still maintaining smaller and intermediate prizes to maintain player interest.

The internet and mobile devices have changed peoples' habits on how they transact business and personal matters and the lottery industry is pressed to incorporate these means into their product line. The comprehensive system of this invention can provide and integrate interactive instant-winner lottery tickets for use with mobile devices and personal computers because the system can, among other things, be designed to: securely communicate with virtually any device; provide the option of having the outcome determination of tickets delivered via mobile devices and personal computers; provide for game simulation as part of the outcome determination, and; provide integration with initial play, second chance play, and extended play via the world-wide web and remote communication means.

Lotteries spend disproportionate costs to administer and maintain traditional instant-winner lottery ticket programs (versus the lotteries' on-line number games, e.g., lotto) and are under constant pressure to reduce their costs. The comprehensive system of this invention can significantly reduce the lotteries' costs of administration because the system, in at least one iteration, is able to provide constant information on the games, including real-time or almost real-time reporting for game sales, thus reducing many of the time consuming procedural duties currently required of lotteries to obtain such information from retailers.

SUMMARY

In accordance with the foregoing, it is an object of the invention to provide an instant-winner ticket gaming system and method in which the tickets are better protected from theft and have both traditional visual and tactile attractiveness, while having enhanced gaming chances for large winnings potential.

It is a further object of the invention to provide such a system and method that implements interactive instant-winner lottery tickets, that is, instant-winner lottery tickets that: (1) are activated via a central system only at the time of or after purchase of the ticket, and/or; are provided the information for the outcome of the particular game at time of or after purchase of the ticket via a device or terminal.

Under this system, "activation" means that a ticket is deemed ready for sale in the computer data base through the scanning of a machine readable code that provides the central system with the information necessary to identify the ticket. Under the traditional instant-winner lottery ticket system, "activation" not only meant that the ticket was deemed ready for sale, but that the system predetermined that the ticket was a winner or loser. Such is not necessary under the system in the current invention.

The type of instant-winner lottery tickets that can be used under different features of the comprehensive system of this invention include traditional instant-winner lottery tickets, traditional-designed interactive instant-winner lottery tickets, and evolutionary-designed interactive instant-winner lottery tickets.

A traditional designed interactive instant-winner lottery ticket is a ticket that looks identical or almost identical to the traditional instant-winner tickets of today, i.e., with play data covered by "scratch-off" material. However, unlike traditional instant-winner lottery tickets, these tickets are activated either at or after its purchase and/or require outcome determination information to be provided at or after purchase. This design allows the ticket to be sold: (1) just as all the other traditional instant-winner lottery tickets are sold today, via in secure placements assisted by clerks or in modified self-service vending machines (where the ticket could be activated before or after purchase depending on the optional ticket designs); and/or (2) in semi-secure placements, such as free-standing displays or other displays as described herein.

If the traditional-designed interactive instant-winner lottery ticket were sold in secure placements, the player would only have access to the ticket upon purchase of the ticket. If such ticket were designed to be activated prior to purchase, then after purchase of the ticket the information necessary to determine the outcome of the particular game (such as the progressive game) is provided via a terminal. If such ticket were designed to be activated only at or after purchase, then whether or not additional information would be needed would be an option of the particular game features. If no additional information were needed, once purchased and activated, the ticket opaque material could be removed and the game results shown to the player just as the player would do today using the traditional instant-winner lottery tickets. However, unlike traditional instant-winner lottery tickets, the invention herein provides an assortment of enhancements.

As more fully described herein, those enhancements include a novel progressive jackpot game, which after activation of the ticket could allow the player, in addition to winning whatever prize might be designated for the underlying play data shown, win a mega prize based on a progressive jackpot. Further, since the ticket information is "interactive" in this invention, novel second chance and extended internet play features from mobile devices and personal computers can be provided, as well as further chances at the mega progressive jackpot prize via play from mobile devices and personal computers.

As more fully described herein, those enhancements also include a novel "fixed" jackpot methodology for instant-winner lottery tickets, which operates similar to the novel progressive jackpot game of this invention, except that the jackpots would not progressively increase. The major objective of this novel methodology is to eliminate the lotteries' "stale" inventory problems, which happen when the top jackpots of a ticket batch are won; thereby making the remaining unsold tickets in that batch "stale." This methodology would allow the top jackpots to be "replenished" (i.e. reset), thus solving the stale inventory problems.

If the traditional-designed interactive instant-winner lottery ticket is made available in semi-secure placements, the ticket (1) can be deemed invalid if played (i.e., the underlying play data is visible) before purchase and activation; and/or (2) can have play data from which the player cannot determine the outcome so that even if the "scratch-off" material is removed before purchase the player would have no advantage on determining the outcome before purchase and activation. Whether or not additional information would be needed would be an option of the particular game creator. If no additional information were needed, once purchased and activated, the ticket "scratch-off" material can be removed and the game results shown to the player just as the player would do today using the traditional instant-winner lottery tickets. The assortment of enhancements from this invention as described herein can then be made available to the player.

An evolutionary designed interactive instant-winner lottery ticket is a ticket that at the time of purchase does not provide the player with a recognizable pattern of numbers, symbols, caricatures or other images to allow the player to determine the outcome of the ticket game. This invention allows an almost limitless ability to provide features for this type of ticket. The two primary arrangements are with (1) incomplete play data and (2) non-humanly determinable complete play data or informational data. Within those two designs are a multitude of variations, including tickets with opaque and non-opaque scratch-off material covering play data and tickets without such scratch-off material.

With respect to the incomplete play data design, there are a variety of ways the play data are provided to the player after purchase of the ticket, including, but not limited to: (1) printing the play data back on to an area on the ticket; (2) printing the play data on to a separate receipt; and/or (3) visually displaying the play data onto a screen (e.g., on a screen at the retail location, on a self-service machine screen, on a mobile device screen, or on a personal computer screen). The player then "plays" the completed play data with the incomplete play data on the ticket in accordance with the rules of the game to determine the outcome of the basic instant-winner lottery game. The progressive jackpot feature of the game then is determined in several different ways as will be described in this invention.

Under the non-humanly determinable complete play data or informational data design, the ticket contains all the play data and/or informational data required of the game (e.g. a bar code identifying the ticket, the ticket price, and the type of game), but only the host computer, and not the player, can recognize and/or determine the outcome of the game, which may or may not be based on any information on the ticket. An example of such a ticket where no play data information is used from the ticket would be one that is designed to allow the computer to randomly determine winners.

Unlike the "incomplete play data" design of prior proposals, no further "completed" play data is necessary to transmit to the player, although a feature of this invention allows the system to transmit computerized completed play data to simulate game plays. Instead of completed play data being transmitted for the player to "play," the central system transmits to the particular device chosen by the player and implemented by the system (e.g. a cash register, a terminal, a mobile device, a personal computer) one or more of a number of functions, which include: (1) the outcome of the game (i.e. whether the player won or lost) by printing either onto the ticket or separate receipt and/or displaying onto a screen at any designated terminal (e.g. cash register, lottery terminal, modified instant ticket vending machine, lottery ticket activation and processing terminal, mobile device, personal computer, etc); (2) the outcome of the game results in summary format with the corresponding winning award, if any, by printing the information onto the ticket or separate receipt and/or, displaying the information on a screen at any designated terminal; and (3) the outcome of the game results in full format (e.g., the actual simulation of the game via printing or showing of the entire game play, such as the playing out of a poker hand, or playing out of a bingo game, or playing out matching symbols, numbers or caricatures) along with the corresponding winning award, if any, that is then printed onto the ticket or separate receipt and/or displayed on a screen at any designated terminal.

One of the features of function (3) above is that it is believed that it can more effectively facilitate internet play on mobile devices and personal computers than any known prior system or method. Under that function, the players can purchase the interactive instant-winner lottery ticket at any designated POS device or terminal, then later input or scan the designated markings on the ticket into a program capable of being played on their mobile or personal computer devices via the worldwide web or other remote communication means, thereby allowing them to see as part of the outcome determination of the game an interactive game played (e.g., a poker hand being played out by a computer, or a bingo card being played out by the computer, or matching symbols, numbers or caricatures being played out by the computer, all on a mobile device or personal computer). Because the player would have purchased the ticket at a retail location, the on-line game play would not be considered "Internet" play for gaming purposes thereby allowing such play to be used in that manner in most lottery jurisdictions. On the other hand, the ticket can be purchased on line where permitted, as further explained herein.

The internet play feature of the invention for mobile devices and personal computers not only allows the customer to play exciting simulated games resulting from purchases of interactive instant-winner lottery tickets, but allows customers to give the tickets away as gifts, so that the ultimate person who receives the ticket as a gift can then determine the outcome results via their mobile device or personal computer rather than visiting a retail location with a connected terminal to obtain such results (although the option would still be available to visit an applicable retail location).

In accordance with the instant-winner ticket designs described above, it is an object of the invention to provide an instant-winner lottery ticket that is comprehensive enough to benefit from all the features of the new gaming system of this invention, including being capable of being played both at retail locations and over the worldwide web or remote communication means from mobile devices and personal computers. This comprehensive interactive instant-winner lottery ticket is one of the evolutionary-designed interactive instant-winner lottery tickets of this invention wherein the determination of the outcome of the ticket is not humanly determinable by the information shown on the ticket. Under this new ticket invention, the ticket would be initially printed with all the completed play data and/or with informational data that may not necessarily be play data, in a format where the outcome of any particular game cannot be humanly determined. This pre-printed ticket would not require partial play data information as the previously proposed non-completed ticket designs have required.

In one version of this invention, the play data on the ticket has some relevance to the determination of whether the ticket is a winner or loser, but the player has no ability to determine from such play data whether the ticket was a winner or loser. In another version of the ticket, there is no play data on the ticket but rather information relating to the particular game or games. Another version of such ticket also has entertainment play data, which is play data for entertainment purposes that is not necessarily relevant to the outcome of the ticket. These tickets do not need to have any scratch-off material but some versions of the tickets would have scratch off material for entertainment purposes.

In order to facilitate the processing of interactive instant-winner lottery tickets and to overcome the problems associated with traditional lottery ticket self-service vending machines and the problems associated with suggested methods of processing non-completed lottery tickets and providing progressive jackpots, it is a further object of the invention to provide a self-service lottery ticket activation and processing terminal, which more efficiently processes interactive instant-winner lottery tickets and/or provides enhanced features of the invention for traditional instant-winner lottery tickets, such as progressive jackpot games.

The terminal includes not only the common self-service functions found in other self-service vending machines, but the ability to activate an instant-winner lottery ticket via the scanning of a machine readable code, the ability to communicate with a host computer, the ability to be part of a distribution of terminals in one or more lottery jurisdictions, the ability to communicate with other POS devices within a designated area or location, the ability to print the outcome determination of a lottery game onto the ticket or separate receipt, and/or visually display such information on a monitor or screen, the ability to provide the option to the player of whether or not to receive the outcome determination of a lottery game (e.g. allow the player to receive the information on a mobile device or personal computer instead), the ability to provide and process a progressive jackpot game, the ability to print or display the progressive jackpot amount and the outcome determination of progressive jackpot play, the ability to provide promotional features (e.g. coupons, discounts, rewards, cross-marketing, advertising, etc), the ability to provide redemption and validation of the tickets, and the ability to provide real-time reporting of transactions.

It is a further object of the invention to provide display units for facilitating the display and distribution of the interactive instant-winner lottery tickets to customers. The display units are part of, and integrated with, the lottery ticket activation and processing terminal, or stand-alone vending units conveniently located in one or multiple places in the particular establishment, including check-out lanes, capable of handling either continuous strands of tickets, in rolls or fan-folded tickets, and/or individually pre-cut tickets. The displays are in semi-secure units to facilitate an orderly manual dispensing of the tickets and/or in easily accessible holders, similar to gift card type displays.

It is a further object of the invention to provide self-service lottery ticket activation and processing terminals as described above that are capable of communicating with cash registers and similar POS devices, and with lottery terminals in a coordinated sale, activation and processing system.

As an example of such a system, a customer is able to select an interactive instant-winner lottery ticket from a display or displays located in a particular retail location, whereupon the customer would be provided the option to purchase the ticket at a cash register, lottery terminal, and/or a self-service lottery ticket activation and processing terminal. If the customer chooses to purchase the ticket at the cash register, the cash register system communicates such purchase to the self-service lottery ticket activation and processing terminal, which then communicates such purchase to the central system and thereupon "activates" the particular ticket. The customer then has the option after purchase to take the ticket to the lottery ticket activation and processing terminal located at the store (or any such similar terminal in any other retail location) to obtain the outcome determination of the ticket or use their mobile device or personal computer and obtain the outcome determination via the worldwide web or remote communication means.

It is a further object of the invention to provide an attendant-operated lottery ticket activation and processing terminal, which provides the same activation and processing ability as the self-service terminal without a bill acceptor and other self-service features. This device could stand-alone without integration with the cash register or other POS device at the particular retail location, or be integrated with the cash register or other POS device. Under a stand-alone configuration, although the particular ticket could still be sold via a POS device, the POS device system would not communicate with this attendant-assisted lottery ticket activation and processing terminal but rather the function of activating and processing the ticket would be separately performed.

It is a further object of the invention to provide the ability of cash registers and similar POS devices to provide some or all of the functions that would be available from a self-service lottery ticket activation and processing terminal previously described without having to be connected to such a terminal. In such a system, a customer could purchase, activate and have the option to obtain the outcome determination information for the ticket all at the cash register or other POS device.

It is a further object to provide such a system and method of this invention for use in traditional instant ticket vending machines with secure interior storage of relatively large quantities of tickets by the inclusion, either within the machine, attached to the machine, or set along side of the machine of a processing device similar to the device described previously for the attendant-assisted terminal having a code reading and printing capability or self-service lottery ticket activation and processing terminal. In such a system, the dispensing of activated or non-activated instant-winner lottery tickets is performed without the simultaneous reading of the ticket so that no completed play data or progressive jackpot is provided at time of dispensing. Instead, the customer would have the option to obtain the outcome determination information (both for the basic instant-winner ticket game and a progressive instant-winner game) for the particular ticket at the lottery ticket and processing unit included in or with the machine (or attached to or located near) or at any other applicable terminal (such as their mobile device or personal computer).

It is a further object to provide a system and method of this invention in which the equipment used is relatively compact, simple and inexpensive to manufacture and maintain.

It is a further object of the invention to provide a separate validation and redemption device that integrates and includes not only instant-winner lottery tickets processed from the system of this invention, but all instant-winner lottery tickets, via communication to a central system.

It is a further object of the invention to provide a random selection method, both on a pooled and non-pooled basis, using either transaction-based information, ticket-based information, or host computer-only information, under the control of the lottery, lottery selected entity or other regulated entity, for determining the instant winner of a progressive jackpot instant-winner game.

Under a transaction-based progressive jackpot system, the information on the particular ticket could be irrelevant to the outcome of the progressive jackpot. Every transaction processed by an applicable machine or device is given a transaction number or other identifying code by either or both the central system and/or the particular machine or device. The central system then uses this transaction number or identifying code as part of the random selection process of the game, or the system uses a random selection process of the game independent of such transaction number or identifying code with respect to the selection of the winning ticket and/or the outcome of the progressive game for that particular transaction.

Under a ticket-based progressive jackpot system, the information on the particular ticket is relevant in the determination of the outcome of the progressive jackpot. Under either method, the determination of the outcome of the progressive jackpot is based on a random selection methodology.

It is a further object of the invention to provide a game of skill based odds game for a progressive jackpot methodology. Under this methodology, the determination of a progressive game winner is determined by a host computer by the simulation of a particular game of skill (e.g., poker). The methodology uses either a transaction-based, ticket-based, or computer-only based process so that the host computer uses some, all, or none of the information provided for and on a particular ticket in the determination of the outcome of the progressive game winner.

It is a further object of the invention to provide for progressive jackpot games for Internet and remote communication play (e.g. initial play, extended play, and second chance play) for traditional instant-winner lottery ticket games, interactive instant-winner lottery ticket games, "simulated" instant-winner lottery ticket games, and/or visual displays initiated from the purchase of traditional instant-winner lottery ticket games and interactive instant-winner lottery ticket games.

There are multiple ways this invention allows for a progressive jackpot system to operate for Internet and remote communication play. For actual physical tickets purchased at a retail location, the invention provides, as previously described, the option for the player to obtain the game results at the location (through the particular device at the location) or on their mobile device or personal computer. If played on the mobile device or personal computer, the system of this invention provides progressive jackpot features for the continued play through those devices. Just as the retail location devices are connected to a central system, the invention provides for the connection of all other devices (e.g. mobile devices and personal computers) to the central system via the worldwide web or remote communication means. Depending on the particular lottery jurisdiction's regulations, if extended play is performed by the player on their mobile device or personal computer (e.g., betting a player's winnings from an original ticket or betting additional money for additional play), this invention provides for a progressive jackpot game to apply to this play as well, which is one embodiment, linked to the same progressive jackpot game or games of the overall system.

It is a further object of this invention to provide for progressive jackpot games for any instant-winner lottery tickets processed through cash registers and other POS devices (such as hand-held devices).

It is a further object of this invention to provide for a progressive jackpot gaming system for interactive instant-winner lottery tickets activated and/or processed at self-service lottery ticket activation and processing terminals, attendant-assisted lottery ticket activation and processing terminals, lottery terminals, cash registers and other point of sale devices, and the Internet and mobile devices, to be linked either together, separate, or in varying combinations, all of the above from intrastate, interstate and international locations. The progressive jackpot methodology of this invention is advantageous in that non-dispensing terminals, including mobile phones and personal computers, can be used in the processing of the interactive instant-winner lottery tickets for the outcome determination information for both the instant-winner ticket game and any related progressive jackpot game.

It is a further object of this invention to provide for a progressive jackpot gaming system for traditional instant-winner lottery tickets activated and/or processed at self-service lottery ticket activation and processing terminals, attendant-assisted lottery ticket activation and processing terminals, lottery terminals, cash registers and other point of sale devices, and the Internet and mobile devices, to be linked either together, separate, or in varying combinations, all of the above from intrastate, interstate and international locations.

Unlike interactive instant-winner lottery tickets, the outcome determination information of the a traditional instant-winner lottery ticket is predetermined and covered by an opaque scratch-off material so that the winning ticket for the basic instant-winner ticket game can be determined by the player after purchase. It is a further object of this invention to provide a new additional instant-winner progressive game to such tickets.

It is another object of the invention to provide promotional discounts, gifts, cross-marketing benefits, and advertisement to customers from the terminals and devices that process interactive instant-winner lottery tickets. Promotional discounts and gifts would include, but not be limited to, theatre discounts, consumable product discounts, and reward programs. The promotional feature is intended to cover "intangible" type product giveaways and cross-marketing. An example of an intangible type product giveaway or promotion is a game that provides that, in addition to the lottery instant-winner game, the player could receive "power play" for a particular video game. The example of "power play" to players of video games is used because video game play is a multi-billion dollar market, whereby players play against each other and against the computer. In order to win many of these games, the players must achieve certain objectives and obtain "power" (in the form of shields, weapons, skill, etc.). If the players can obtain such "power" from lottery instant-winner ticket purchases, it will incentivize them to purchase lottery tickets, while promoting the particular game. This invention thus provides advertisement to the game providers and incentives for lottery purchases, thereby creating a win-win economic relationship for the lotteries and game providers.

It is a further object of this invention to provide Internet use of interactive instant-winner lottery tickets from mobile devices and personal computers. There are a number of uses including: providing the outcome determination information for the particular interactive instant-winner lottery ticket; providing second chance play; providing extending play; providing simulated games; providing the ability to purchase interactive instant-winner lottery tickets including simulated tickets (such as on a display screen); providing progressive jackpot games from transactions associated with second chance play, extended play, and original play from mobile devices and personal computers, and; providing promotional discounts, gifts, cross-marketing benefits, and advertisement.

In accordance with the present invention, the foregoing objectives are facilitated by a host central computer with software and communication means sufficient to operate and communicate with multiple peripheral devices (e.g., hundreds of thousands of devices). The peripheral devices include cash registers and point-of-sale devices, lottery terminals, attendant-assisted and self-service modified vending machines, attendant-assisted and self-service lottery ticket activation and processing machines, and mobile devices and personal computers. Every possible point-of-sale means and terminal access means that are capable of secure communication is capable of communicating with this central computer system under a fully comprehensive system design including wired, wireless, intranet, internet, satellite and cellular communication.

In accordance with the present invention, many of the foregoing objectives are met by the provision of a system and method utilizing a plurality of pre-printed tickets in a display or displays in a retail outlet and/or distributed by other means, such as mailings, and providing a central system with a computer for remote connection to clerk-assisted and self-service ticket activation and processing terminals, cash registers and other point of sale devices, lottery terminals, and, via the worldwide web or remote communication means, mobile devices and personal computers, and which provides instant-winner progressive jackpots, in addition to the usual instant-winning games.

One method of lottery ticket supply and distribution provided by this invention includes supplying a plurality of different tickets for different instant-winner lottery games, with the tickets being non-activated, activating each ticket only after it has been paid for, determining whether the ticket is a winner of a relatively low-level prize and/or a progressive jackpot prize, and indicating to the customer immediately when the customer has been displayed the outcome information for the particular instant-winner lottery game and won either the low-level prize or a progressive jackpot prize, or both prizes. The winning of the lower amount available in the normal instant game can be indicated in one of several ways, by alerts displayed on the terminals; by printing the outcome determination information onto the ticket or separate receipt and/or, showing the information on a screen at a terminal; by comparing a random number, caricature, symbol, or other image printed on the ticket itself with a similar image number under a scratch-off coating covering a pre-set image; or in other ways.

The foregoing and other features and advantages of the invention will be set forth in or apparent from the following description and drawings.

BRIEF DESCRIPTION OF THE DRAWINGS

FIG. 1 is a perspective view of one embodiment of a ticket display unit constructed in accordance with the invention;

FIG. 2 is a perspective view of a stand-alone lottery ticket activation and printing unit ("LTAP" unit) comprising one embodiment of the invention;

FIGS. 3, 4 and 5 are front elevation views, partially broken-away, of three different examples of tickets which can be used in the invention;

FIG. 18 is a front elevation view of another ticket and FIG. 19 shows the lower portion of the same ticket used in another game of the invention;

FIG. 20 is a front elevation view of another ticket of the invention, one that is specially adapted to be given as a gift; and FIG. 21 is a schematic flow diagram showing different screen presentations on the screen of LTAP, POS or other sales devices showing the processing of gift tickets.

DETAILED DESCRIPTION OF THE PREFERRED EMBODIMENTS

Figure 6:
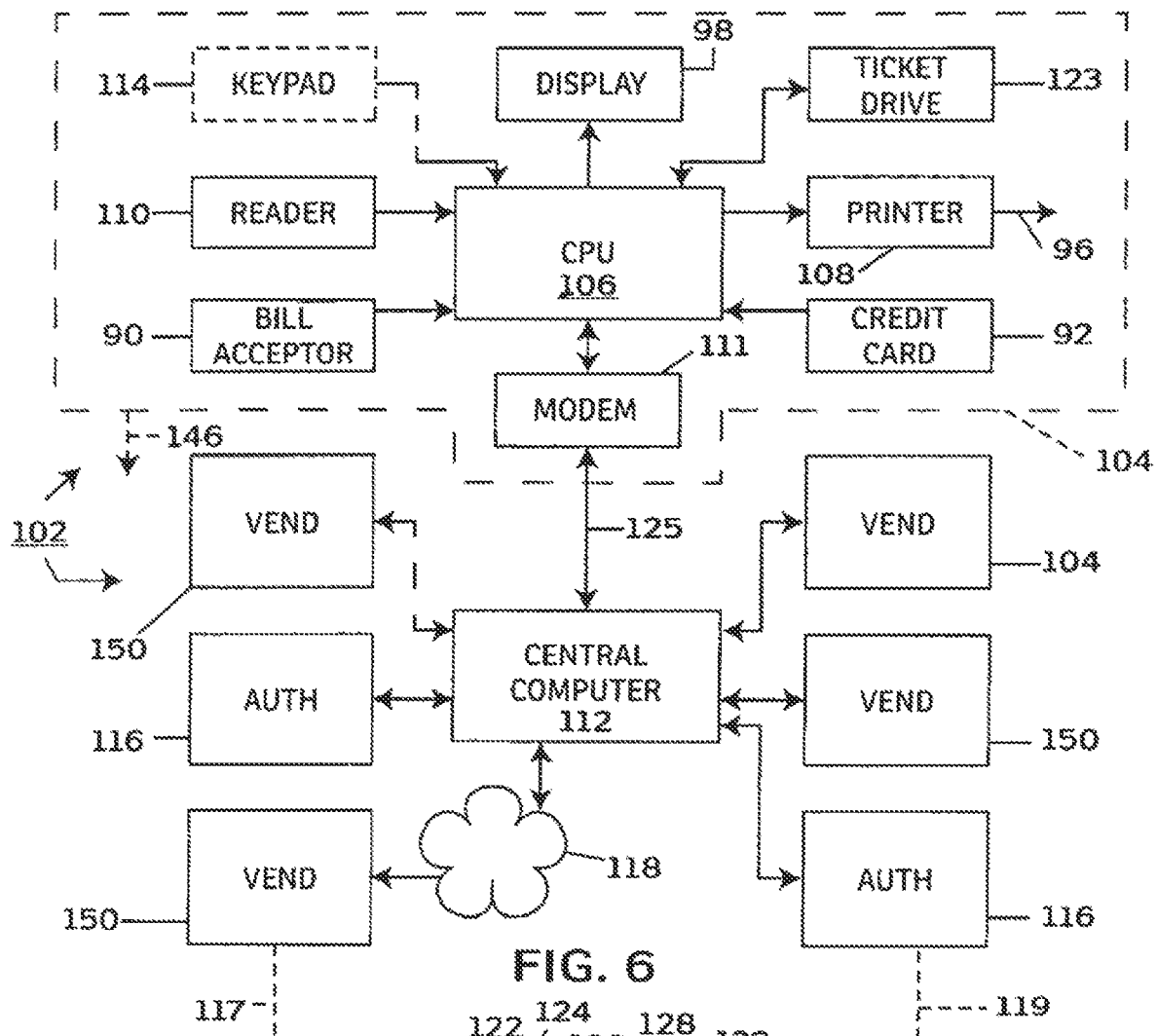
FIG. 6 is a schematic circuit diagram of the terminal shown in FIG. 2 and other terminals, all connected in an instant lottery system.

The drawings show an unenclosed instant-winner lottery ticket display unit 10 in FIG. 1 and a separate stand-alone lottery ticket activation and processing ("LTAP") unit 86 in FIG. 2. Referring first to FIG. 1, the unit 10 displays a plurality of pre-printed non-activated instant-winner lottery tickets such as tickets 16, 18, 20, and 22. The tickets are displayed on a display stand 12 with vertical compartments 14 into which the interactive instant-winner lottery tickets are loaded. Because the lottery tickets are not activated, they are freely accessible to any customer who wishes to use one of the tickets to win both the usual instant prizes and an instant "growing" or "progressive" jackpot prize as well.

The availability of the combined instant game and instant progressive jackpot features is displayed prominently on a front panel 28 and/or other visible surfaces of the display unit.

Each of the pre-printed lottery tickets 16, 18, 20 and 22 is for a different game. The game tickets 16 are for a $2 game in which each ticket costs $2; tickets 18 and 24 are for a $3 game; tickets 20 and 26 are for a $5 game, and tickets 22 are for a $20 game. Examples of some of these tickets are shown in FIGS. 3, 4 and 5, and will be described in greater detail below.

The display unit 10 is shown resting on a table or other convenient horizontal support surface 30.

Other well-known types of displays (not shown) can be used. They include see-through plastic displays where the tickets are displayed on rolls formed by ticket strips with each ticket connected by perforated lines or in pre-cut single ticket format. The displays include those that are stacked with one row of multiple tickets on top of another row in order to display varying numbers of ticket games. The displays also include those in checkout lanes at retail stores where the tickets are either in be in enclosed or unenclosed ticket containers.

Referring now to FIG. 2, the LTAP machine 86 preferably is located on a support surface 100 near one or more display units 10 for non-activated tickets in the same edifice, such as a store, an indoor shopping mall, or other place where people shop or congregate for other purposes. However, various combinations of display units 10 and LTAP units 86 can be distributed throughout the location in combinations advantageous to the location. Also, if preferred, a display unit can be positioned closely adjacent to, or attached to each terminal 86.

The LTAP unit 86 includes a housing 88, a bill acceptor 90, and a credit card acceptor 92 for accepting payment for a ticket. The machine 86 includes an optional display screen 98 which displays both advertising messages and winning information to both attract and inform the ticket buyer. The electronic operating equipment of the unit is described below, in connection with FIG. 6.

The purchaser inserts a ticket into a ticket receiving slot 94, wherein the internal system for the unit 86 detects and indicates whether sufficient payment has been received for a ticket (which could occur at a POS device prior to insertion of the ticket into the LTAP unit 86). If payment is required, the purchaser provides payment with cash into bill acceptor 90, or optionally with a credit, debit, or loyalty card into such device 92. The ticket bears coded identifying information which is read by a code reader in the machine 86, and when sufficient payment is received, the ticket is activated. Depending on the interactive instant-winner lottery ticket type, the purchaser receives an option to obtain other information including game-playing information at that moment or obtain the game-playing information later via other remote communication means, such as a mobile device or personal computer. Other embodiments will require such information to be provided only at the LTAP unit 86 and other designs will require such information to be provided only remotely on a mobile device or personal computer. If the purchaser elects to obtain the information or is required to receive the information based on the game design at the time of activation, then the other information including game-playing information is either printed on the ticket, on a separate piece of paper, and/or visually displayed, and the activated ticket is returned to the buyer through a separate ticket return slot 96, or through the same slot 94, depending on the type of transport mechanism used to transport the ticket in the machine. If applicable, the additional game playing data bearing paper would also be provided to the buyer.

The housing 88 includes a hinged front door accessible by lottery personnel by means of a lock 97.

It should be understood that the LTAP machine 86 also can be used with a previously activated ticket such as one taken from an ordinary scratch-off ticket vending machine, to enter it into an instant progressive jackpot game.

Non-Activated Lottery Tickets

Figure 10:
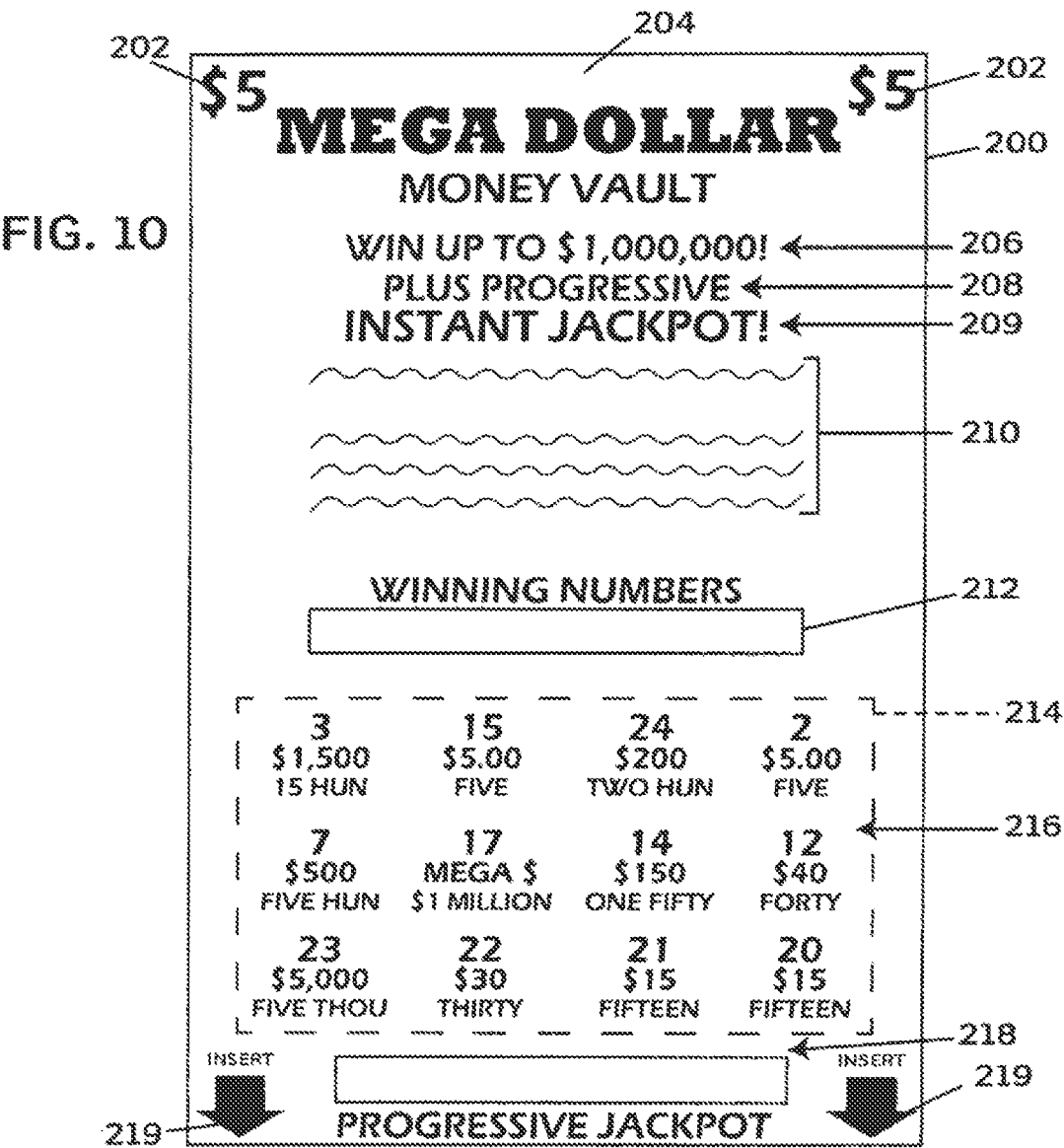
FIG. 10 is a front elevation view of an instant-winner lottery ticket which can be stored in and dispensed from the vending machine of FIG. 8.
Figure 11:
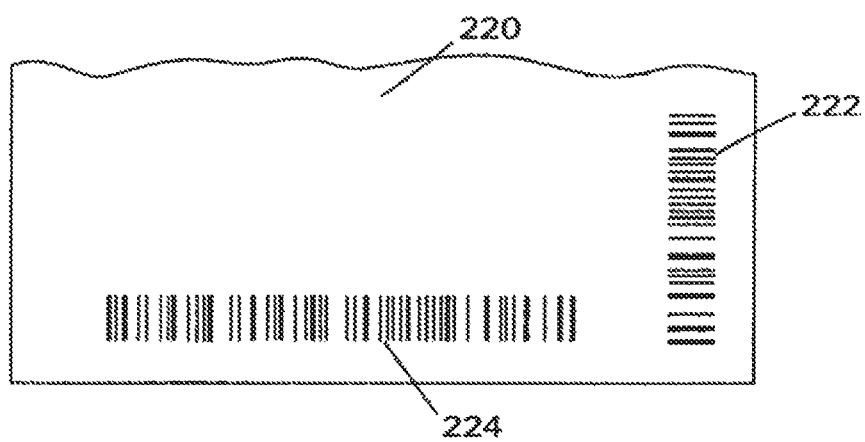
FIG. 11 is a rear elevation, partially broken away view of the ticket shown in FIG. 10.

FIGS. 3, 4 and 5 show three of the many different types of pre-printed instant winner lottery tickets 18, 20 and 22 which can be used in the present invention. FIGS. 10 and 11 show a different example of such a ticket, which will be discussed later in this description.

As it is advertised on the front panel of the display unit 10, and as it has been explained above, each ticket is adapted to be non-activated, so as to be secure and not subject to theft before it is sold to a customer. The ticket is pre-printed with price, decorations for attractiveness, and a listing showing the potential winnings not only of the traditional, regular instant game, but, also, the instant winning of a progressive jackpot.

Each ticket bears a unique pre-printed identification code 42, 60 or 78. In this case, some of the code is a UPC barcode which is arrayed longitudinally of the ticket so that it can be read when inserted into an activation machine.

Each ticket 18, 20 or 22 contains various game information such as the maximum amount that can be won in the regular instant game such as shown at 32, 50, and 68. Also, appearing on each ticket is a unique, attractive, game title 34, 52 or 70 together with decoration (not shown) to attract the eye and impulse buying instincts of customers.

Each ticket also includes a position 36, 54 or 72 at which is displayed the price of the ticket such as $3, $5 and $20, respectively. Instructions as to how to use the ticket are printed at 44. The tickets are larger than shown in FIGS. 3-5, and are shown broken-away as indicated at 37, 55 and 73 to keep the drawings compact.

The ticket 18 shown in FIG. 3 has a first information area 38 which is covered by a scratch-off coating that is marked "SCRATCH." The coating can be scratched off by the customer in the usual way, so as to compel the customer's participation in the game in order to disclose various information covered by the coating 38. For example, a unique number can be made to appear. When the lower ticket end 46 is inserted into the machine 86 in the direction indicated by the arrow 48, the identification code 42 is read and transmitted to a central computer, and a computer-generated random number is printed in a blank space 40 labeled "PRINT".

Simultaneously, the central computer enters the ticket number into a progressive jackpot detecting system which detects whether either the number appearing at the scratch-off location 38 or the unique ticket number 42 matches a progressive jackpot winning number, in which case the information that the jackpot has been won is printed in the space 40.

Simultaneously, upon the winning of a progressive jackpot prize, a message to that effect appears in the screen 98 of the machine 86 to inform the winner of his good fortune even more visibly and emphatically. This additional feature is optional, depending upon whether the lottery system operators believe that the information is necessary and desired to be displayed by the winning ticket holder. If desired, the optional display feature can be activated only by the customer pressing a specific button or switch to let the customer control the public dissemination of that information.

The ticket 20 shown in FIG. 4 is similar to the ticket 18, and has legends at positions 50, 52 and 54 corresponding to similarly located legends on ticket 18.

Ticket 20 differs from ticket 18 in that it has no scratch-off material covering the space 56. In the space 56 is printed a pre-determined number such as the number shown "0007170."

Alternatively, the space 56 can be blank like the space 58 so there would be no partial play data on the ticket and all the play data is subsequently printed onto the ticket, or alternatively onto a separate piece of paper and/or visually displayed When the ticket 20 is inserted into the machine 86, the identification code 60 is read and a random number is generated and printed in the print space 58. If that number matches the number in space 56, then the match indicates that the relatively low-level regular or "standard" game is won. Also, if the number in space 56, or the coded ticket identification number or another randomly-generated number matches a random number generated by the central computer, the progressive jackpot is won and that information can be printed in the space and displayed on the display screen 98, if desired. Again, playing instructions are given at 62, and the arrow 66 indicates the direction of insertion of the lower edge 64 of the ticket into the slot 94.

If both spaces 56 and 58 are blank, the printer can be directed to print two or more numbers or poker hands or other symbols for matching in the traditional game, as well as progressive jackpot winnings.

Referring now to FIG. 5, the ticket 22 has the same type of legends as the other tickets at 68, 70 and 72, except that the standard game relates to poker, and several poker hands are covered under the scratch-off covering at 74. When the central computer receives the unique identification code from reading the ticket at 78, it can determine whether the ticket is an instant winner in that one or more of the poker hands displayed has a winning rank. The fact that a winner has been detected and the amount won are printed in space 76. Alternatively, the detection of a winner and the amount won is not printed, but rather the player would determine if they won from visual comparison and from a pre-printed prize structure, as well as from a redemption and validation device.

As in the other tickets shown in FIGS. 3 and 4, if the ticket identification or a randomly-generated number matches another randomly-generated number, the ticket is a winner of the progressive jackpot prize as well.

As an alternative, in the use of instant tickets in a poker game, or in all games, the progressive jackpot win can depend on the appearance on the ticket of a very rare poker hand, such as a royal flush, in which case a progressive jackpot win depends on poker odds, not necessarily just number matching.

The lower end 82 and the insertion arrow 84 correspond to those in the other tickets shown in FIGS. 3 and 4.

Lottery System

FIG. 6 is a schematic diagram of a lottery system 102 incorporating the electrical components of ticket vending machines connecting to a central computer 112 which performs the functions described above and to be described below.

Shown in dashed outline at 104 is a block diagram of the electrical components of a stand-alone activation and processing machine 86 shown in FIG. 2. With modifications to be described below, the circuit 104 represents other ticket vending machines as well.

The components include a central processing unit 106, a code reader 110 to read the identification codes from the pre-printed, non-activated lottery tickets, and send them to the computer 112; a printer 108 for printing information on the ticket and/or on separate paper, and a ticket drive device 123 for moving the inserted ticket past the reader and printer, and ejecting it through the outlet 96; the credit card reader 92 and the bill acceptor 90, both of which send appropriate signals to the CPU when the proper amount of money has been paid, the display 98, and a modem for interconnection with the central computer 112. Optionally, an additional printer is available for printing of promotional cross-marketing type rewards and advertisement. Such rewards and advertisement also can be printed using the same printer 108.

An optional keypad 114 (see also FIG. 7) is provided, as needed.

In addition to the circuitry 104 for one stand-alone vending machine, another is shown in FIG. 6 similarly connected to the central computer 112. In addition, another unit 116 which is called an "activation" unit, to be described below with respect to FIG. 7, also is connected to the central computer. Further vending machines 150, to be described below, are connected in the network to the central computer. One vending machine 150 is shown connected to the central computer through the worldwide web or remote communication, indicated at 118. That unit also schematically represents remote units, such as personal and laptop computers, smart phones and other remote devices which can be used to remotely play the lottery games, where permitted.

It should be understood that many more units normally will be included in the system 102, but only a few have been shown, by way of example. The connection of such added units is indicated schematically at 117 and 119.

Although direct connections between the remote units and the central computer are preferred for security reasons, it is within the scope of the present invention to utilize the worldwide web and wireless for communications, assuming that thorough-going and highly secure encryption is used.

The area covered by the system 102 shown in FIG. 6 can be widely variable in size. For example, it can cover an area as small as a single store or shopping mall, and as large as a city, a state, a country or even groups of countries.

Activation Terminal

Figure 7:
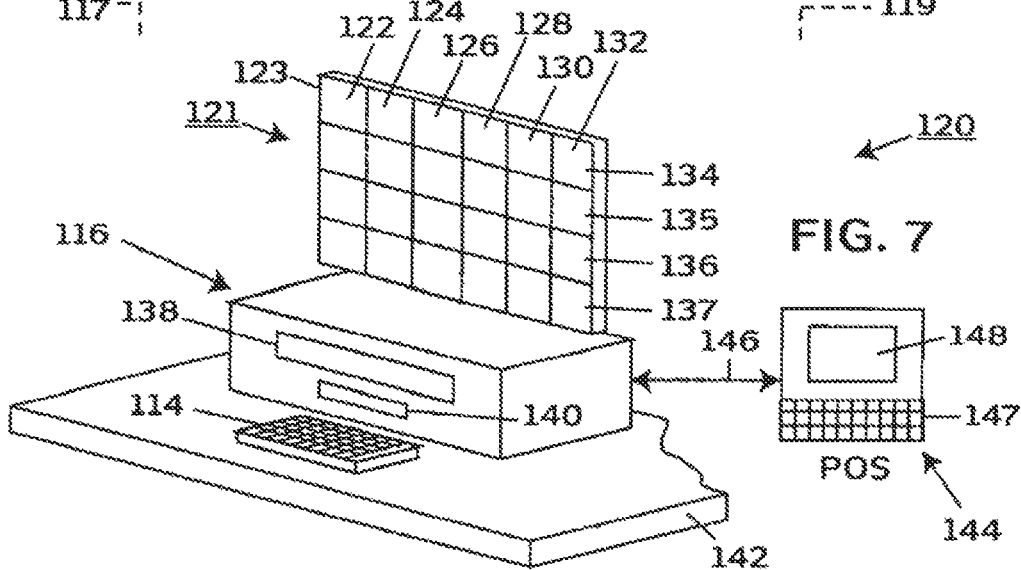
FIG. 7 is a perspective schematic view of another embodiment of the invention.

FIG. 7 shows an attended merchandise and ticket sales station 120 which typically rests on a counter 142 might appear behind a counter in a small store or other similar location where an attendant is available almost continuously to sell store merchandise and lottery tickets, and where customers usually are denied access to the tickets. A POS terminal 144 is provided for sales of items other than tickets, and, in some embodiments, it is used to sell lottery tickets too.

The station 120 consists of an activation terminal 116 and a lottery ticket display and dispensing structure 121 mounted above the terminal 116.

The terminal 116 is similar to the stand-alone terminal 86 shown in FIG. 2, except that it is smaller and simplified. Since the terminal is attendant-operated, the terminal does not need either a bill acceptor or credit card reader because the payment for the tickets is handled manually by the attendant, with or without the POS terminal. The unit 116 includes a display screen 138 and an input/output ticket port 140. In addition, an optional keypad 114 is provided, and is connected as shown in FIG. 6.

The lottery ticket display structure 121 is of a type commonly used in small stores where lottery tickets are sold by an attendant. The display includes a frame 123 in which rows 134-137 and columns 122, 124, 126, 128, 130 and 132 of tickets are displayed within reach of a clerk. The tickets advantageously can be of a wide variety of sizes and shapes, all of which can be accommodated by the input/output slot 140 for authentication and win determinations, etc. However, the lottery ticket display and dispensing structure could be located anywhere in the store, such as on gift card type racks in single pre-cut tickets, or in enclosed displays on rolls or as single tickets. Since the tickets are non-activated, they can be accessed by the buyer prior to purchase unlike traditional instant winner lottery tickets, which require high security.

The optional keypad 114 is provided in order to enable the unit 116 to operate independently of the POS device 144. The use of a user name and a password is preferred for gaining access to the unit 116 because it does not need to receive payment in order to operate to print and authenticate a non-completed ticket. This provides some protection against meddling or theft due to operation by unauthorized persons.

A particularly simplified version of the terminal 116 is one which has in common use as a check acceptance reader/printer at supermarket checkout counters, the NCR Real POS 7167 Multifunction Printer. It does not have a visual display but can print on the front and back of paper or cardstock, and provides the basic functions needed, including printing winnings on tickets.

The POS terminal 144 also can be used alone as an activation terminal in the check-out lane of a supermarket or other retail store. Preferably, the tickets sold are of the type not needing printing on the tickets themselves, but the outcome determination information can be provided on cash register receipts or coupon tapes instead. However, printing could also be provided on the tickets through the check validation and printing features of most POS terminals.

The tickets are dispensed at the station 120 when the customer selects the ticket or tickets which he or she wishes to purchase and pays for them. Then the attendant removes the individual tickets from the rolls, inserts them one by one into the input/output port 140, thus activating them, and determining whether they are winners of the standard game, and also whether they are winners of the progressive jackpot prize. The winning information is displayed on the screen 138, as well as being printed on the ticket.

It should be understood that the dispensing station 120 is very simple and somewhat archaic and may not be used very widely since other displays, of which there are many, can be used and positioned elsewhere, where the customers can reach them. However, FIG. 7 shows how the invention can be used in even the oldest forms of distribution set-ups, thus demonstrating its versatility.

Figure 9:
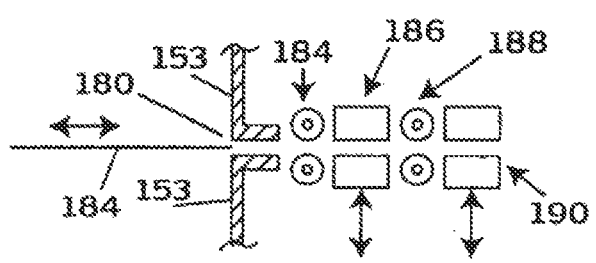
FIG. 9 is a schematic diagram of a component of the machine shown in FIG. 8.

The reader and printer used in the unit 116 are of a variety such that when a ticket is inserted into the opening 140, it is grabbed and pulled inwardly by a transport mechanism, the code is read from the ticket, and information is printed on it, and then drive mechanism in the machine reverses direction and ejects the ticket back through the opening 140. Such a printer/reader will be described in somewhat greater detail below and is shown in FIG. 9. Alternatively, the ticket is inserted without a transport mechanism so that once it is properly inserted, it is processed, then pulled out of the mechanism manually when an indication light informs the player when to remove.

Such a simplified reader/printer mechanism also could be used in the stand-alone vending machine 86 shown in FIG. 2. However, the two-port system shown in FIG. 2 for input and output of tickets because it usually can be made more secure against some forms of theft and vandalism.

It is within the scope of this invention to connect the unit 116 to the point-of-sale terminal (cash register) POS 144 as indicated at 146 so that keyboard inputs can be made from the keyboard of the point-of-sale device instead of the keypad 114.

In addition, if a larger or more complex display is needed than the screen 138 on the unit 116, the display can be provided on the larger screen 148 of the point-of-sale device.

In fact, if the screen, keyboard, and user identification and password features of the POS device 144 are used together with a simple reader/printer as described above, the unit 116 can be relatively small and inexpensive. The scanner of the POS device can be used to scan the bar codes on the tickets to further simplify the device 116, and, in fact, the POS device can be adapted to perform all functions of the activation device 116, if preferred.

It also is within the scope of this invention to print the game play information and jackpot winning/losing information on a separate receipt of ordinary or special use paper, instead of printing that information directly on the ticket itself. However, it is preferred to use selectable, pre-printed lottery tickets to play ordinary instant winner games with an instant progressive jackpot.

It should be understood that a loyalty card can be used instead of or in addition to a credit card or a debit card as payment means for the terminal shown in FIG. 2.

The system within a LTAP unit preferably is programmed so as to store data from all transactions and prepare automatic reports regarding sales, winnings, and reports for system service personnel.

Enclosed Multi-Game Ticket Vending Machine

Figure 8:
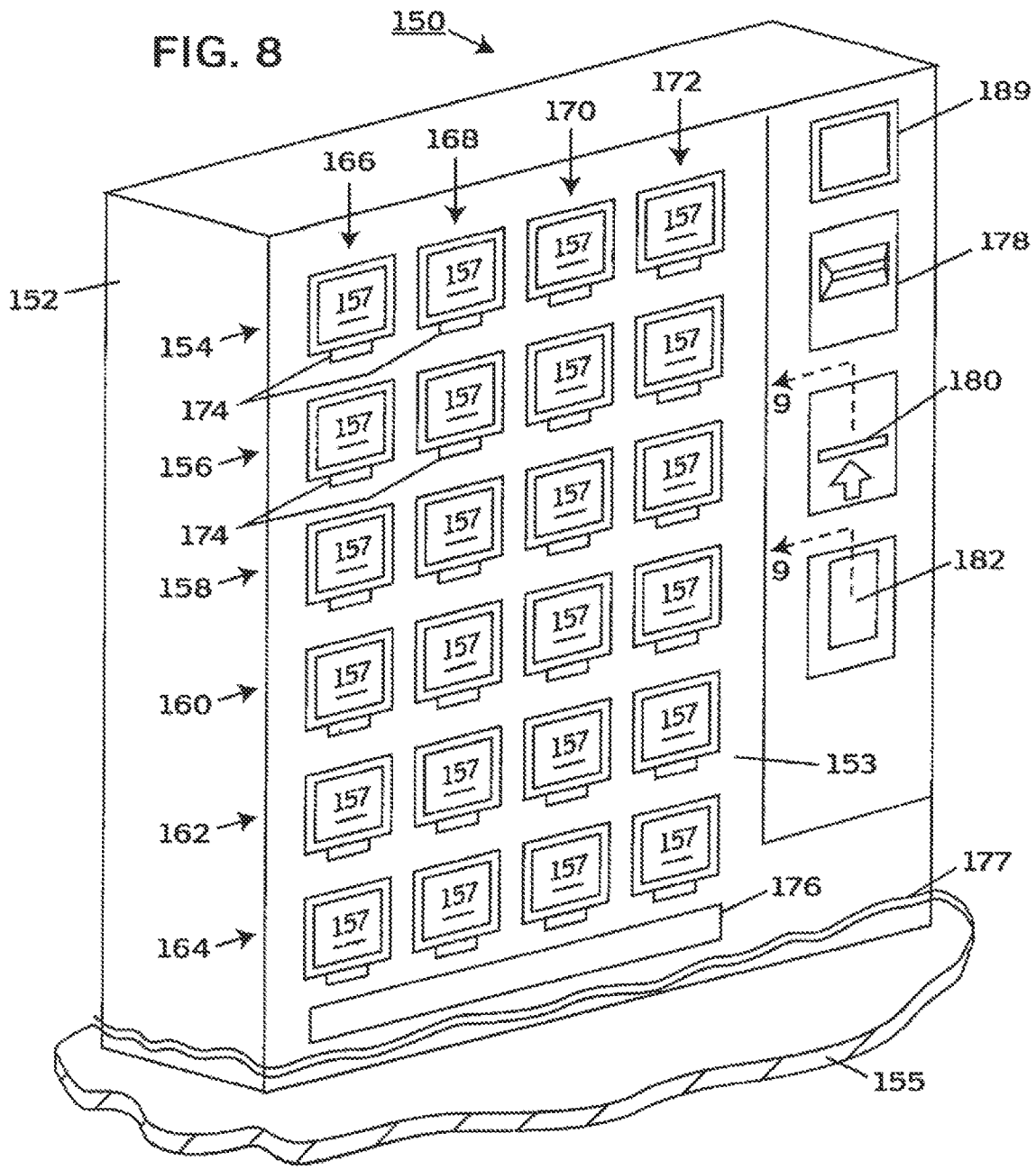
FIG. 8 is a perspective view, partially broken-away, of a modified vending machine forming a further embodiment of the invention.

FIG. 8 of the drawings shows an enclosed multi-game ticket display, dispensing and activating unit 150 which is constructed in accordance with the present invention. The unit 150 is physically very much the same as some current scratch-off instant winner lottery ticket vending machines which are in widespread use in the U.S. However, the unit 150 differs in that it has a ticket inlet/outlet slot 180 for use in activating lottery tickets. Also, in accordance with the present invention, the lottery tickets stored in and dispensed from the machine are non-activated tickets.

If desired, each ticket can be the same as a regular scratch-off instant ticket.

Alternatively, the ticket can be non-completed, as well as non-activated, as shown in FIG. 3, and has a scratch-off coating 38 over a set of numbers or symbols to be used in playing a traditional or instant-winner game. However, whether and how much the ticket wins depends upon a completion of the ticket by printing on it further game play data which will allow the owner to determine whether the ticket is a winner, and how much it has won in the normal instant-winner game.

In addition, separate numbers, symbols, caricatures, or images are printed on the ticket, after it has been dispensed, indicating whether the ticket has won a jackpot prize, usually much larger, in addition to the traditional game prize.

The vending unit 150 includes a housing 152 with a front panel 153 with 24 different windows 157, arranged in six horizontal rows, 154, 156, 158, 160, 162 and 164, and four vertical columns 166, 168, 170 and 172. Preferably, each window displays a different type of ticket, although some windows can display the same type of ticket as other windows. The tickets may be of widely varying price, e.g. $2, $3, $5, $10, $20. The price for each ticket is given in a LED display 174 extending below each window.

The machine 150 has a dispensing tray with an outlet 176 into which the buyer can reach to retrieve a ticket that has been dispensed. The housing is shown broken-away at 177, for the sake of compactness in the drawings. The lower part of the housing, if shown, would be of greater height so as to support the ticket tray above the floor 155 by a substantial distance.

A bill acceptor 178 and a credit card reader 182 (if the lottery authority permits it) are provided for payment for the tickets.

The way the machine 150 is used is that the customer puts in the proper amount of money or credit, and presses on the window 157 in which is displayed the ticket the customer has selected. The machine then dispenses the ticket at 176, as it is well-known.

In accordance with the present invention, as stated above, the tickets in the machine 150 are non-activated. That means that the central computer 112 (FIG. 6) has not performed the tasks it usually performs when activating the tickets, just as they are loaded into a vending machine or other storage container from which activated, "bearer instrument" tickets are sold.

After the ticket has been dispensed, it is activated by inserting it into the input/output slot 180 (also see FIG. 9).

As it is shown in FIG. 9, a ticket 184 is inserted into the slot 180 and a first set of rollers 184 moves the ticket past a code reader 186 which reads the code on the ticket, and a second set of rollers moves the ticket to a printer 190 which prints numbers determined by the central computer. Alternatively, the ticket may not move past a printer but instead separate paper is used with the printer.

Also printed on the ticket is information indicating the winning of a progressive jackpot prize in addition to the prize, indicated by the normal game indicia. Also, a display screen 189 is provided to display the changing amount available in the jackpot, and then it displays information that the progressive jackpot has been won, when that occurs.

The winning ticket then can be cashed in the normal way, either with a local attendant in the business establishment where the machine is located, who can pay relatively small winnings, and larger winnings and jackpot prizes being paid by the lottery authority which owns and operates the lottery system.

The winning ticket is checked in a simple, well-known verification device which reads the code on the ticket and receives information from the central computer that the ticket is a winner, and the amounts of the winnings.

The advantages of the embodiment shown in FIGS. 8 and 9 are several. First, although the machine 150 is relatively more expensive than the unit shown in FIG. 2 or 7, it protects the tickets from vandalism and mindless pilferage. Furthermore, it stores the tickets in fanfold form with perforations between them, a form which can be more economical than storing individual pre-cut tickets such as those shown displayed in FIG. 1.

In addition, the machine 150 usually will store many more tickets than the display devices shown in FIGS. 1 and 7. This is advantageous in relatively high-traffic locations so as to minimize the frequency with which the ticket supplies must be replenished by service personnel.

Another advantage is that many such machines already have been distributed and are in use at the present time. Therefore, the only manufacturing required is retrofitting each machine to provide a ticket authentication and printing opening 180, and a reader and printer with connections and programming suitable for operation in the network shown in FIG. 6. Such retrofitting also can be provided by attaching a unit to the side or front of the machine.

Thus, the existing machines can be converted for use of the invention, thereby enabling the minimizing of fraud and theft, as in other embodiments of the invention and enabling the award of both traditional instant winnings and instant progressive jackpot winnings.

FIG. 6 of the drawings shows two of the vending machines 150 connected together with other machines forming the lottery system 102.

Broad Ticket

FIG. 10 shows the front surface of a typical broad ticket 200 such as that usually dispensed from instant ticket vending machines like that shown in FIG. 8. The relatively broad tickets often are of different lengths, depending upon the price of the tickets; the longer tickets generally costing the most.

The ticket 200 shown in FIG. 10 is a $5 ticket called "Mega Dollar," just one sample of the many, hopefully attractive titles that can be used for such tickets. The front of the ticket is shown at 204 of FIG. 10, and the rear surface 220 of the bottom portion of the ticket is shown in FIG. 11, broken away.

The maximum amount of $1 million which can be won in the traditional game is shown in line 206. Lines 208 and 209 announce that an additional progressive instant jackpot prize also is available to be won with the purchase of the ticket. Lines 210 give the instructions for playing the game.

A blank space 212, not covered by scratch-off material, is provided in which so-called "winning numbers" are printed when the ticket is inserted into the printer slot 180. A block of numbers is shown at 214 which normally is covered with a scratch-off coating 214.

Inside the boundary 214 and under the coating are a set of numbers 216, there being 12 numbers in this case. Each number such as 3, 15, 24 and 2 has a prize amount underneath it, such as $1500, $5, $200 and $5, etc.

The number 17 has the "MEGA" prize of $1 million. Pursuant to the instructions 210, the player knows that if one of the winning numbers matches any of the numbers in the array 216, the player will win the amount of money printed underneath the number in the array 216.

Another blank area 218 is provided near the bottom of the ticket into which the results of the progressive jackpot routine created by the selling and insertion of the ticket will be printed.

Arrows 219 near the bottom of the ticket indicate the direction in which it is to be inserted in the printer slot 180 of the vending machine 150 shown in FIG. 8.

Referring to FIG. 11, printed in the bottom portion of the rear of the ticket are two barcodes 222 and 224, in different formats, each of which is readable by a code reader. Barcodes are used for ticket distribution and identification.

When the ticket 200 is inserted into the slot 180 of the vending machine, the barcode 222 or 224 is read and player is provided the option to obtain the outcome determination information immediately or delay such information for purposes of gifts or playing later on a pc or mobile device. If the decision is made to obtain the information immediately, the printer is instructed by the central computer to print a plurality of "winning numbers" in the space 212 for the player to use in playing the traditional instant winner game. These can be random numbers generated then and there, or they can be pre-determined numbers and stored for that ticket. Alternatively, the printer would print the information on a separate slip of paper. Further, alternatively, the information would be provided via visual display and/or printed display.

In addition, the printer will print words to the effect that the progressive jackpot has or has not been won, and, if won, the amount that has been won.

Therefore, the player purchasing the ticket 202 can win two or more times; at least one, in the regular instant winner game, if one of the "winning numbers" matches one of the numbers in the array 216 covered by scratch-off material. If there are two matches between winning numbers and numbers in the array 216, then the player wins two prizes in the regular game.

Furthermore, the player is given a chance to win the progressive jackpot as well. If that is won, the fact is printed in the space 218, and/or is displayed on the display screen 189 on the front of the machine 150. In addition to those options, the player is also provided second chance play and extended play features.

Multi-Unit Subassembly

Figure 12:
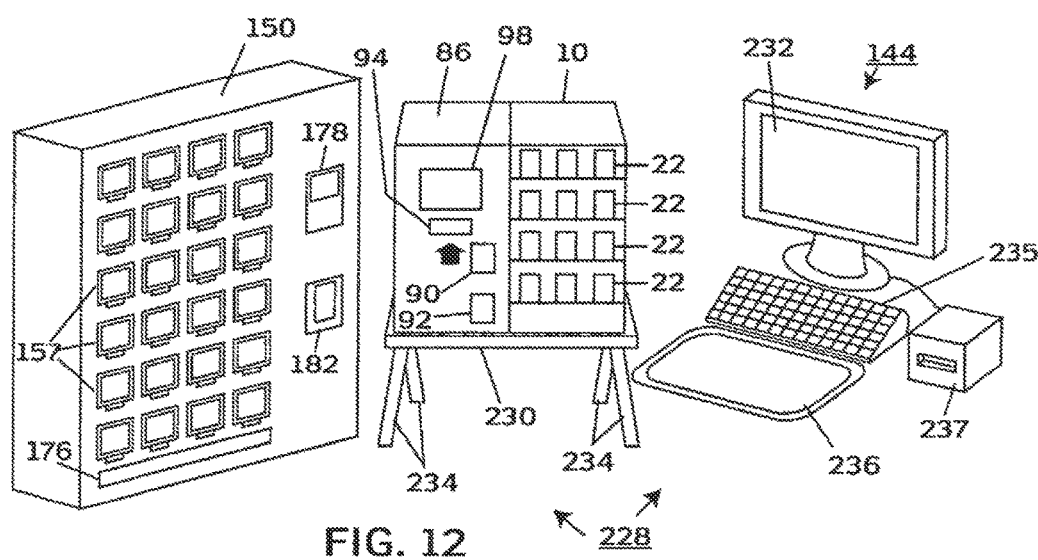
FIG. 12 is a perspective, partially schematic view of an assembly of machines cooperating to provide enhanced instant-winner ticket vending and enjoyment.
Figure 13:
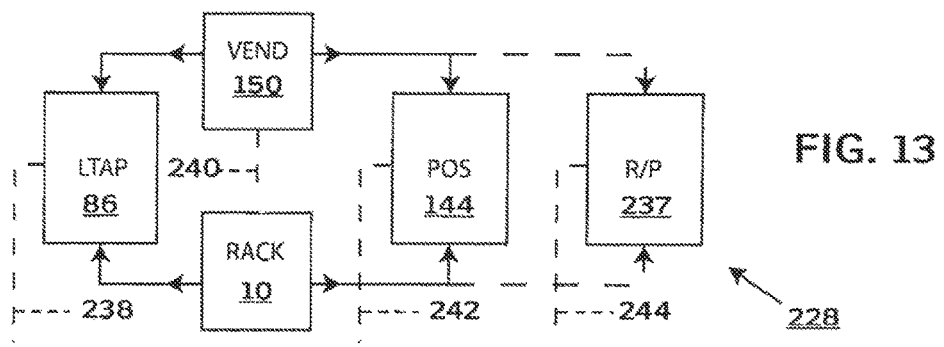
FIG. 13 is a schematic diagram showing the operating process of the FIG. 12 assembly.

FIGS. 12 and 13 show a multi-unit instant-winner ticket vending subassembly 228 which has synergistic features.

The assembly 228 includes an enclosed conventional scratch-off ticket vending machine 150, which is the same as the unit 150 shown in FIG. 8, except that it is a standard machine that has no modifications, an LTAP unit 86 as shown in FIG. 2, a display unit 10 as shown in FIG. 1, and a POS unit 144 as shown in FIG. 7. A reader-printer unit 237 is shown in FIGS. 12 and 13.

The sub-assembly 228 can be used in locations such as supermarkets, mass merchandise superstores, etc. or wherever the assembly's use is advantageous.

The enclosed vending machine needs no modifications to add a reader/printer because the LTAP unit 86 has a reader/printer and an inlet/outlet slot 93 for the reader printer, as shown in FIG. 12.

The display rack 10 is mounted with the LTAP unit 86 on a table 230 with legs 234.

The POS device 144 is of a standard type commonly used at check-out counters in superstores. It has a screen 232, a keyboard 235 and a scanner window 236 upon which the barcodes on the products and lottery tickets can be scanned.

The reader/printer 237 is like the unit 116 shown in FIG. 7, and can be a conventional check scanner/printer used at many check-out counters.

Electrical connections of some of the units to the central computer are shown schematically at 238, 240, 242 and 244 in FIG. 13. The remote pc's and other mobile devices are indicated schematically in FIG. 6, item 150, connected to the central computer through the worldwide web 118.

As it is shown in FIG. 13 by the arrows leading from the enclosed vending machine 150 and the display rack 10, a ticket taken from either source can be taken either to the LTAP unit 86 or the POS unit 144 where the identification code and other information can be read, the information needed for the traditional game can be read, and the winning information displayed on a screen 98 on the LTAP or 232 on the POS unit 144, and printed on the ticket, if the LTAP unit 86 or reader/printer 116 is used. This also is true for progressive jackpot wins. Optionally, the disclosure of the winning or losing information can be deferred for later access from a terminal or remote device, so as to allow the disclosure to be private, or to create a gift ticket.

There is synergy in the assembly 228 in that when the LTAP unit is used with the enclosed vending machines 150, the machine 150 needs no modifications to enable it to add the progressive jackpot feature to the traditional or non-activated tickets issued by the machine 150. The LTAP unit will activate the ticket, if needed, and enter the ticket for the jackpot, and print and/or display the results, as desired.

In addition, the display unit 10 provides numerous additional non-activated tickets 22 which are available at the same location as the unit 150, thus effectively multiplying the number of different games available to the customer at that location.

The availability of the POS unit 144 and/or the reader/printer unit 116 makes activation and play of the tickets very convenient and avoids loss of sales when some of the units are in use by others. Of course, the ability to carry the tickets away and perform the same reading printing functions over the Internet from remote devices with reader/printers further increases the utility and convenience of the lottery system.

Instant Progressive Jackpots

In one embodiment, all LTAP units, activation units and vending units in the system 102 (FIG. 6) are linked together to form one large progressive jackpot source pool that allows a progressive jackpot to grow quickly because multiple players at multiple retail locations contribute to the jackpot at the same time.

In another embodiment, only selected units in the system are enabled to participate in the pool.

The amount of the progressive jackpot earned from each transaction is established by the host lottery in accordance with its particular regulations.

The amount of the jackpot usually changes frequently as each new transaction is accounted for. Preferably, the current jackpot amount is displayed prominently on the display 98, 138 or 189 of each ticket unit 86, 116 and 150.

The central computer stops the accumulation of any further funds for the progressive jackpot when that jackpot has been won, and a new jackpot is created with a smaller amount of money.

The smaller amount can be a fixed sum, or it can be determined by accumulating a "shadow" jackpot of a smaller amount per ticket transaction simultaneously with the accumulation of the main jackpot, and then substituting the "shadow" jackpot for the main jackpot when a winner has been detected so as to start the new main jackpot with the total in the "shadow" jackpot.

In another embodiment, there is provided one major progressive jackpot and a number of smaller progressive jackpots that can be won more frequently than the major jackpot. In this way, the players would have the chance at both a large jackpot and smaller jackpots, which still would be larger than the prizes in the traditional games.

Under the foregoing embodiment, only the transactions through the LTAP or other vending/activation machines participating in the progressive jackpot are counted in determining the jackpot. Therefore, the ticket sales in the overall system are not used.

It is preferred that the main progressive jackpot increases by a certain percentage of the amount paid for each ticket, and that the shadow jackpot increases from a starting value of either zero or a fixed starting amount by a smaller percentage of the amount paid. Alternatively, the increase is a fixed amount for each ticket transaction.

The amount paid for the ticket, as well as other information, is present in the code printed on the ticket, and is recorded in the host computer.

For example, the main jackpot might increase at the rate of 3% of the amount paid, and the shadow jackpot at 1%. If there are subsidiary jackpots in addition to the shadow jackpot, they can increase at a lower rate as well, from a fixed positive starting amount, or from zero.

This progressive jackpot system and method are believed to greatly increase the interest in the instant-winner lottery tickets, without adding a large number of new standard games, and without having to add a large prize for each of a large number of standard games.

If desired, the progressive jackpot feature can be limited by awarding it only to holders of certain ones of the instant-winner tickets, and the selling price of those tickets adjusted accordingly, as permitted by applicable lottery rules.

Novel Fixed Jackpot Methodology

In addition to the novel instant progressive jackpot system and method, this invention also includes a novel "fixed" jackpot methodology for instant-winner lottery tickets, which operates similar to the novel progressive jackpot game of this invention, except that the jackpots would not progressively increase. Under this methodology, one or a plurality of the jackpots of an instant-winner lottery ticket game would not be pre-designated on a particular lottery ticket. Instead, a central computer would determine the particular fixed jackpot based on a methodology that does not pre-designate a particular ticket, such as a random number generator, or designations on the tickets (such as ticket codes that could designate certain tickets to be entered into the particular jackpot selection), or some other methodology. The computer would calibrate the algorithm for the odds for the jackpot based on the odds established for that jackpot in the particular game.

This invention methodology solves the problem of "stale inventory" for a lottery. Stale inventory occurs when a preprinted batch of lottery tickets, which have preprinted and designated jackpots on the tickets, have the tickets that have the highest amounts of those jackpots purchased and used. Once the highest amounts of jackpots are won through purchase of those tickets, players generally do not want to purchase more of the ticket batch since there is no chance of winning a high amount—thus making the remaining tickets "stale." Under that scenario, the lottery could then lose money on the game because not all the tickets would be sold in the game batch, yet the highest prizes would have been paid. To solve that problem, under this novel system, the highest amount or amounts could be randomly determined in the same manner that the progressive jackpots are determined under the progressive jackpot methodologies, or they can be determined in some other manner, except that the amounts do not progress (i.e. they do not increase, since they are fixed). If the highest amount is won, the system can automatically "replenish" the jackpot so it can continue to be won as more tickets are purchased, thus solving the lotteries' stale inventory problems. This invention also enables a lottery to continue a game for as long as players want to play it, instead of stopping a game as soon as all the tickets are sold or all the top prizes are won.

Progressive Jackpot Winner Determination

Determining the winner of a progressive jackpot can be done using a number of methods, but the main methods are those using pooled and non-pooled methods.

A. Pooled Methodology

Under the pooled methodology, as in the non-pooled methodology, a progressive jackpot would be the same except that the progressive jackpot under the pooled methodology would be under a designated "pool" of ticket numbers or transaction numbers or other pool of alternative machine readable codes, whereas in the non-pooled methodology there would be no designated "pool" of ticket numbers or transaction numbers.

Method One: Decreasing Pool and Increasing Odds

One method of selecting a winner of a progressive jackpot game or system is to create a pool of serial numbers or other identifying numbers or codes (including theoretical transaction numbers or codes) for a large batch of tickets or a theoretical batch of transactions (e.g., 100 million). The central system could then determine a winner based on one of the three methods described. Once determined, the particular machine or device would be notified for processing of the progressive jackpot as described previously. Under this method, the pool preferably expels each serial number of a ticket or transaction or other identifier of the ticket or transaction which has been processed but did not win. If the pool is otherwise unchanged except for the deletion of that particular ticket number or transaction identifying number, the odds of winning increase for the remaining numbers in the pool.

If a ticket-based method were used, there would be a certain pre-determined number of serial numbers or other identifying numbers of such tickets and each instant-winner lottery ticket would have a serial number or other identifying number that is part of the pool. Once the instant-winner lottery ticket was purchased and processed, the central computer would use one of the three methodologies to determine the outcome of the progressive jackpot. The central system could independently determine whether the ticket was a winner or loser either based on randomly created independent criteria (e.g., matching of numbers randomly generated by the computer), based on a matching of a random computer generated numbers of symbols with similar numbers or symbols on the ticket, or based on a number or symbols from a predetermined game design (e.g., a royal flush for a progressive poker game). If the ticket was not a winner, the serial or other number would be deleted from the pool, and when the next instant-winner lottery ticket was purchased and processed the central computer would again proceed with the same sequence to determine if the ticket was a winner or loser. This would continue until a winner occurred. Since the pool would shrink with each non-winning ticket, the odds increase and a winner will eventually be determined from that decreasing pool.

Under the ticket-based methodology, an additional feature could be used that would provide that once a winner was determined the pool could be restocked with additional serial or other numbers so that more instant-winner tickets could be distributed using the same game or games thereby allowing for the remaining tickets that have not been sold not to be irrelevant. Once restocked, the progressive jackpot could proceed as before after it was reset.

Under the first pool method, if the progressive jackpot used a transaction-based approach, a theoretical pool of transaction numbers could be created so that those numbers would be used rather than the ticket numbers. As instant-winner lottery tickets are processed through the machines and devices, a number or code would be designated from the theoretical pool for that transaction. The central computer could determine the number or code from the pool that was a winner for that particular transaction based on one of the three methodologies described. If the particular transaction was not a winner, the number or code would be deleted from the pool, and when the next transaction through those machines and devices was processed the central computer would again determine the number in the remaining pool that was a winner using one of the three methodologies described. This would continue until a winner occurred. Since the pool would shrink with each non-winning transaction, the odds increase and a winner would eventually be determined from that decreasing pool. Once a progressive jackpot was one, the theoretical pool of transaction numbers could be restocked and the progressive started again.

Method Two: Evergreen Pool and Same Odds

Alternatively, the numbers expelled (i.e., the losing numbers or codes for the tickets or the transactions) can be immediately replaced by new numbers or codes, to keep the odds of winning the same.

Under the second pooled method, just as in the first method, if a ticket-based method were used, there would be a certain pre-determined number of serial numbers or other identifying numbers of such tickets and each instant-winner lottery ticket would have a serial number or other identifying number part of a pool. Once an instant-winner lottery ticket was purchased and processed, the central computer would use one of the three methodologies to determine the outcome of the progressive jackpot. The central system could independently determine whether the ticket was a winner or loser either based on randomly created independent criteria (e.g., matching of numbers randomly generated by the computer), based on a matching of a random computer generated numbers of symbols with similar numbers or symbols on the ticket, or based on a number or symbols from a predetermined game design (e.g., a royal flush for a progressive poker game). The same sequence of events as in the first pooled method would occur with respect to a progressive jackpot, except that the pool would never shrink because for every non-winning ticket a new serial or other ticket number would be put into the pool, so that it always had a preset number of serial or other numbers. Therefore, under this method, the odds would always be the same for every purchaser since the number of potential winning serial or other numbers would always be the same.

Similarly, if the progressive jackpot used a transaction-based approach, a theoretical pool of transaction numbers could be created so that those numbers would be used rather than the ticket numbers. As instant-winner lottery tickets are processed through the machines and devices, a number or code would be designated from the theoretical pool for that transaction. The central computer would determine the number or code from the pool that was a winner for that particular transaction based on one of the three methodologies described. For every non-winning transaction the losing number or code would be deleted and a new number or code would be put into the pool so that it always had a preset number of numbers making the odds always the same for every transaction. When there has been a win, the progressive jackpot can be reset and the remaining numbers would continue for the new progressive.

This invention allows for a number of other variations of the pooling concept.

B. Non-Pooled Methodology

The only difference under this methodology is that there would be no pre-determined pool of tickets or transaction numbers for the purpose of determining the progressive jackpot. Therefore, the methods described below could be similarly used for the pooled methodology.

Method One: Computer Determines all Numbers

Under this method, although the central computer would keep track of the serial or other applicable numbers or codes for the instant-winner lottery tickets under the ticket-based approach or for the transaction numbers or codes created for the transactions using the transaction-based approach for inventory control and reporting purposes, the serial numbers or other applicable numbers for the tickets or for the transactions would have no consequence to the progressive jackpot other than to initiate the outcome determination. The serial numbers or other applicable numbers would simply be the authenticity identifier of the particular ticket or transaction for the progressive jackpot outcome determination.

Under this method, when an instant-winner lottery ticket was purchased and processed (if the progressive jackpot was ticket-based) or when a transaction was processed through an applicable machine or device (if the progressive jackpot was transaction-based), the computer would internally generate two or more sets of numbers with predetermined odds (e.g., 1 in 100 million) of matching. If matched, the particular ticket or transaction involved would be deemed the winner of the progressive. The jackpot would then be reset back down to zero (or more likely, to a preset amount, either from a set amount or a progressive shadow jackpot amount), and the progressive game could continue without a restocking necessity. There would never be a need for restocking of numbers and there would never be irrelevant tickets because each ticket sold or transaction processed would have the same chance of winning since there would be no pooling of serial numbers or other numbers, symbols or codes for winners.

In summary, the first non-pooled method of selecting a winner does not depend on the reading of a serial or other applicable number from the ticket or transaction. Every time a ticket or a transaction is processed, each of two or more random number generators develops a random number. The numbers would then be compared; and, if they match, notification, via visual display and/or printed receipt, is given to the applicable customer that he or she has won the progressive jackpot.

Method Two: The Particular Ticket or the Particular Machine or Device has or Generates Numbers or Other Codes Used for Matching Under the second non-pooled method, a ticket-based approach could be used where the instant-winner lottery ticket would contain relevant numbers or other codes that would be used in the determination of a progressive jackpot, or a transaction-based approach could be used where the particular machine or device would generate a transaction number or other code for each ticket processed and that number or code could be used in the determination of a progressive jackpot. In this method, the central system instead of randomly generating all the numbers used for matching as in the first method, it could use one set of the numbers or other codes from either the ticket or the transaction. The central system would then generate the other one or more other sets of random numbers from the central system to be matched with the numbers or other codes from the ticket or transaction.

If the numbers are originally printed on the instant-winner lottery ticket, the ticket could display the numbers in a variety of ways. First, the numbers could simply be the serial numbers of the ticket in human and/or machine readable form. Second, the numbers could be displayed as random numbers on the ticket in colorful graphics visible to the customer as well as in machine readable form. Third, the numbers could be random numbers on the ticket placed under a covering so that the player must physically remove the covering to see the numbers as well as having the numbers available in machine readable form. Instead of numbers, caricatures, symbols or other codes could be used. An assortment of other ways of presenting such numbers or other codes could also be used.

The numbers or other codes could include the same number of digits as the computer generated numbers or other codes so that they would need to match to be a winner. The numbers or other codes on the ticket or from the transaction would not have to be pre-printed or generated in any sequential manner; they could be random numbers or other codes that are preprinted or generated from the same computer program. In that way, the player could actually choose a ticket with a number they preferred. Alternatively, the numbers could be scrambled so that the player has no ability to determine the sequence that will be used by the computer. Once an applicable ticket was purchased and processed, the computer could then generate the second or more set of random numbers or other codes (using a preset odds formula). If matched, the ticket or transaction would be a winner, and the game could continue for the remaining applicable instant-winner lottery tickets after the progressive is immediately reset.

In summary, the second non-pooled method is one in which, instead of two or more random numbers or other codes all being generated at time of processing by a central system, one random number or other code would either already be printed on the applicable ticket or one random number or other code would be determined as part of the transactional number or other code using the applicable machine or device. The ticket or transactional number or other code would be compared with the random numbers or other codes generated by the central computer at the time of activation or processing to determine a winner.

Method Three: The Particular Instant-Winner Game Determines how the Progressive is Won Unlike the other methods described, under this method the particular instant-winner lottery game itself would determine the method of winning the progressive jackpot. This methodology is especially applicable to theoretical games of skill (e.g. poker, blackjack, craps, etc.), even though the computer program may ultimately determine all outcomes with no skill from the player. Under this method there are no matching requirements as described previously. Instead, the particular game would have a random event that could occur during the game play that would determine the winner of the progressive jackpot.

Poker is a good example of a game that could be played with a progressive under this methodology. Under this example, an instant-winner poker game could be designed under this method with a progressive jackpot occurring upon a certain event, such as the hitting of a particular sequence of cards (e.g., a royal flush). Since the odds of a particular sequence of cards can be pre-determined, a progressive game could be established with the odds of hitting the progressive jackpot based on the game itself. Therefore, the progressive jackpot could be designed to be won upon the player having a royal flush (or some other sequence) after playing the instant-winner lottery game. The central system, of course, may be generating random numbers, caricatures, and/or other symbols (e.g., the cards in a poker game) for the instant-winner lottery game, but the progressive feature would not necessarily need to involve a matching process under this methodology since the occurrence of an event in the game itself would determine the progressive winner. This does not mean the game itself could not involve matching but only that matching would not necessarily be required unless designed into the game as an additional feature (e.g., the player could be required to have a royal flush that matches another royal flush from a random theoretical player designated in that particular instant-winner lottery ticket). The requirement to obtain two royal flushes would push the odds even higher. This methodology is particularly useful with all types of card games.

There are a plethora of variations under the non-pooled methods. For instance, instead of numbers, the computer could use caricatures or symbols (bells, whistles, cartoon caricatures, game caricatures, such as monopoly, wheel of fortune, etc), so that those caricatures or symbols are required to be in a certain sequence or that they are matched in some other random manner with another set of those caricatures or symbols.

Both pooled and non-pooled methods can be advantageous depending on the type of legislative requirements for the games. The ticket-based and transaction-based approaches provide a plethora of designs that can be created for progressive jackpot games. The ticket-based approach allows the lotteries the greatest ability to have progressive jackpot game designs that are limited only by the imagination, but such approach requires technology that scans the relevant information from the particular tickets. The transaction-based approach, although less flexible in game designs, allows the lottery to enable progressive jackpots with less technology as the ticket information does not necessarily have to be scanned.

Further, as described above, and as shown in FIGS. 3 and 4 of the drawings, some tickets have coverings over the random numbers and some simply display the random numbers without coverings. Coverings would be used primarily for entertainment purposes, or to provide security against pre-activation viewing, if that is deemed desirable. Preferably, all tickets have colorful graphics to entice the player to play, since these features have proven extremely beneficial for the marketing of instant tickets.

Other known electronic progressive jackpot selection processes also can be used. Each has the advantage, in an instant-winner lottery game, of allowing the terminals to be located over very wide areas, including many states, and even countries, because truly random selection can be assured. The randomness is not affected by real or apparent bias, fraud or the risk of theft in the location of a physical winning ticket.

Regardless of which method is used, the attraction of the usual instant-winner tickets and games, when combined with the added attraction of the instant progressive jackpot game, creates a powerfully attractive game.

Use of the World Wide Web

The invention is one that allows non-activated instant lottery tickets to be used on the worldwide web.

There are a multitude of potential Internet functions and features that could be provided for interactive instant-winner lottery tickets; these include: (1) providing completed play data and/or determining ticket results; (2) providing extended or second chance play; (3) providing simulated games; (4) providing the means to purchase the tickets; (5) providing the ability to play an assortment of lottery games; (6) providing progressive jackpots and progressive jackpot games; and (7) providing the ability to receive promotional discounts, awards, advertisements, and games.

If the Internet is used for communication between the remote terminals, the "central" computer can be the "cloud" instead of a separate computer arrangement. In fact, the "central" computer can be a distributed computer system, and need not be located in a single location.

Strong encryption of information will be required to protect the integrity of any system using the Internet.
The Use of the Internet or Remote Communication Means for Providing Completed Play Data and/or Determining Ticket Results on the Internet One object of this invention is to allow a player to use the Internet or remote communication means (such as cellular connection) to provide the completed play data for a non-completed CAT purchased at a retail location that provides such tickets. For this process, instead of having the completed play data printed or visually displayed at a POS device (e.g., the LTAP unit, lottery terminal, clerk-assisted device, cash register, etc) in the retail location, the player could have the option to purchase the interactive instant winner lottery ticket at the retail location without obtaining the completed play information at the POS device, then have the ability to obtain the completed play data on their mobile phone or from a personal computer by typing in the particular human readable serial number or code on the ticket (or scanning the machine readable bar code, mark or other code on the ticket). This feature could not only allow customers to enjoy playing the tickets at their leisure but providing the tickets as gifts.

As for interactive instant-winner lottery tickets that do not require further play data, such as those described under Evolutionary-Designed CAT, the player can use the Internet or remote communication means (such as cellular connection) to provide the information indicative of the outcome of the particular game. For this process, instead of having the determination of outcome of such ticket revealed at the POS device at the retail location, the player would have the option to purchase the ticket at the retail location and determine the results on a mobile device or personal computer. The player would type the particular human readable serial number or code on the ticket (or scan the machine readable bar code, mark or code on the ticket) into the mobile device or personal computer and have the determination of the outcome of the ticket provided to the player via the Internet using a mobile device or personal computer.
The Use of the Internet or Remote Communication Means for Providing Extended Play and Second Chance Play on the Internet Another object of this invention is to allow a player to use the Internet or remote communication means (such as cellular connection) to provide either extended play or second chance play from an interactive instant winner lottery ticket. The ability could be provided once a player purchased the ticket regardless of whether the player obtained the completed play data or relevant information, depending on the type of ticket design, at time of purchase at the retail location or over the Internet. The purchase of the ticket would occur at an applicable machine or device at a retail location or it could occur over the Internet. The second chance play would provide the player the ability to enter into another instant-winner lottery ticket game, interactive instant ticket game other lottery product game, or promotional game, via the Internet as a result of simply purchasing and playing the original interactive instant winner lottery ticket. Information on the ticket could instruct a player how to play the second chance feature (e.g., by providing a specific code and website information) or separate use of a lottery loyalty card could instruct a player how to use a ticket for second chance play.

The extended play feature could provide the player the ability to purchase, or play for free, additional instant-winner lottery ticket games, interactive instant winner lottery ticket games, and/or other lottery product games, via the Internet as a result of simply purchasing the original ticket. Information on the ticket or display near the ticket or on a website would instruct a player how to play the extended play feature (e.g., by providing a specific code and website information) or separate use of a lottery loyalty card could instruct a player how to use an applicable ticket for extended play. The present invention can utilize existing instant-winner game themes with which players are accustomed while allowing the Internet capabilities to provide additional and extended play to those themes. Entertaining and graphically exciting card games, keno games, bingo games, slot machines and sports games, to list a few examples, would be capable of being downloaded under this invention and these games can be priced to provide extensive and prolonged play value. For example, a blackjack card game would provide fast action and could provide the player with 20 hands for an initial $1 purchase. Preferably, prizes could be smaller but large enough to fund additional play.

The Use of the Internet or Remote Communication Means for Providing Simulation of Instant-Winner Games on the Internet One of the unique advantages of Evolutionary-Designed interactive instant winner lottery tickets is that the ticket can allow for the simulation of instant-winner games as part of the completion of the play data process and/or completion of the information regarding the outcome determination process, depending on the type of ticket design. As previously described, a partially completed ticket or a completed ticket with non-recognizable outcome requires that either the completed information be provided or that the information regarding the outcome determination be provided.

As part of the presentation of the completed information or outcome determination, the full or partial simulation of the instant-winner game could be displayed either at the particular machine or device at the retail location on an applicable screen, or on a mobile phone or personal computer. The system would allow the player the option of purchasing the ticket at a retail location, receiving the ticket in the mail and purchasing over the Internet, or going to a designated website to purchase a simulated ticket, and inputting the relevant information from the ticket as instructed (or scanning the machine readable code) into their applicable mobile device or personal computer, whereupon the completed information or outcome determination could be provided along with the simulation of the instant-winner game being played. For example, if the game involved a matching process, the player would see a live streaming of different numbers, caricatures and/or symbols being revealed one by one until the play was complete and the outcome determined. In another example, if the game involved cards, such as poker, the player would see a live streaming of a poker hand being played, where the cards could be dealt one by one to the player and to other theoretical players until the hand was complete and the outcome determined. A simulated game would provide more interaction and entertainment to the player then the simple display of the completed information or outcome information.

This feature is different from currently provided Internet games, which simply involve providing different games on line for promotional purposes and/or for purchase. The feature herein relates solely to interactive instant-winner lottery tickets, which are purchased at retail locations and/or received via the mail and purchased via the Internet, and/or purchased directly from a designated website, and not to Internet originated games. The feature is an add-on feature to the computer-activated instant-winner lottery game system, not a stand-alone feature as found today in stand-alone Internet games.

The Use of the Internet or Remote Communication Means for Providing the Ability to Purchase Interactive Instant Winner Lottery Tickets Unique features of the ticket allow a multitude of different designs. Some of these designs allow players to purchase the ticket at retail locations and play the ticket over the Internet via their mobile phone or personal computer. Other designs allow the player to obtain the ticket at retail locations (or via the mail) and purchase the ticket via the Internet from their mobile phone or personal computer depending on the particular lottery jurisdiction's laws and regulations. If allowed to be purchased via the Internet, the player could have the option of purchasing the ticket at the retail location or simply choosing the ticket at the retail location displays, then taking it home and purchasing it later over the Internet, via a mobile device or personal computer. The same features would be available for the ticket purchased over the Internet.

The Use of the Internet or Remote Communication Means for Providing the Ability to Play an Assortment of Lottery Games As mentioned under extended play features, the ticket and system can be designed to allow the player the ability to play an assortment of lottery games over the Internet. As with all interactive instant winner lottery tickets, there could be a multitude of different designs that could be created for this feature.

The first is an extended play type design where the player could be provided the option to play one of an assortment of additional lottery games via their mobile device or personal computer after initially purchasing and playing a ticket. This type design could be used in almost any interactive instant winner lottery ticket.

The second is a completed play design where the player could be prompted to choose among an assortment of lottery games the particular game that will be used to provide the completed play. This type design could be primarily for Evolutionary-Designed instant winner lottery tickets where the ticket has only partially completed play data or completed play data that is not humanly recognizable.

A third type design is an "Internet" ticket where the player could be specifically informed that the ticket is solely to be played on the Internet. The ticket design would allow for the amount of money of the ticket to be applied to one or an assortment of lottery games made available to the player on their mobile device or personal computer.

The Use of the Internet or Remote Communication Means for Providing Progressive Jackpot Games and Systems for Internet and Remote Communication Play As described under the progressive jackpot games and systems herein, this invention creates a progressive jackpot gaming system for Internet and remote communication play from computers and/or mobile devices from the use of instant-winner lottery tickets purchased from retail locations or obtained from retail locations, or tickets obtained at retail locations or via the mail and purchased over the Internet. The design of this system is essentially the same as previously described for progressive jackpots. A central system would be capable of interfacing with mobile devices and personal computers via a secure remote communication network. The initial play, second chance play and/or extended play from instant-winner lottery tickets on mobile devices and personal computers would then be processed through the central system and, where designated by the game designs, a progressive jackpot feature could be provided to some or all of the Internet play. The progressive jackpot feature could be for Internet play only or it could be an extended feature for part or all of other instant-winner lottery tickets played at retail locations from POS machines and devices.

The Use of the Internet or Remote Communication Means for Providing the Ability to Receive Promotional Discounts, Awards, Advertisements, and Games As described under promotional discounts, awards and advertisements herein, a benefit to the lotteries of implementing the system is the ability to provide promotional discounts and gifts (e.g. theatre discounts, consumable product discounts, rapid rewards, etc.) and advertisement. The Internet or remote communication means can be used to provide these promotional features. Once the player entered (or scanned) the applicable information from the ticket into their mobile device or personal computer the system could provide, via software programs with the lottery and/or various vendors, a plethora of discounts, rewards, and advertisements.

Also, this feature is intended to cover "intangible" type product giveaways (e.g. provide more "power play" to players of video games). The example of "power play" to players of video games is used because video game play is a multi-billion dollar market, whereby players play against each other and against the computer. In order to win many of these games, the players must achieve certain objectives and obtain "power" (in the form of shields, weapons, skill, etc.). If the players could obtain such "power" from lottery ticket purchases, it would incentivize them to purchase lottery tickets, while promoting the particular video game. Under this feature, once the player entered (or scanned) the applicable information from the ticket into their mobile device or personal computer the ticket system could provide, via software program coordinated or provided by the particular vendor, this promotional feature as well as a simulation of the particular video game. These features provide advertisement to the game providers and incentives for lottery purchases, thereby creating a win-win economic relationship for the lotteries and game providers.

There are a multitude of other promotional benefits that will become obvious to many companies once the system is implemented by lotteries. These tangible and intangible benefits would not only be applicable to video game providers, but to airlines, retail stores, restaurants, travel entities, governments, and many others.

Extended Play and Second Chance Play

Another feature of this invention is that a player can be provided either extended play or second chance play, from an instant-winner lottery ticket activated and completed at one of the terminals described above, or via the Internet. The second chance play allows the player to purchase more instant-winner lottery tickets or any lottery products via the Internet from the winnings of a prior instant lottery ticket.

The extended play feature allows the lottery to provide all its lottery products to the player via the Internet. The present invention can utilize existing instant-winner game themes with which players are accustomed while allowing the Internet capabilities to provide additional and extended play to those themes.

Entertaining and graphically exciting card games, keno games, bingo games, slot machines and sports games, to list a few examples, would be capable of being downloaded under this feature, and these games can be priced to provide extensive and prolonged play value. For example, a blackjack card game provides fast action and could provide the player with 20 hands for an initial $1 purchase. Preferably, prizes would be smaller but large enough to fund additional play.

Progressive jackpots can be made available in any of the foregoing game varieties.

Validation, Redemption and Cancellation

The various activation terminals described above can be used for validation of tickets, as well as for activating them. A retail clerk can insert the ticket into one of the units 86, 116 or 150, and the identification code will be read and the winning status and amount will be verified, thereby allowing the retail clerk to pay the player his or her winnings.

As for cancellations, during the process of selling a non-activated instant-winner lottery ticket, the completed play data would not be transmitted from the offline host computer until verification of payment. Therefore, if the customer cancels the purchase prior to payment (as some customers do while checking out), then the retail clerk would still be able to cancel the activation of an already scanned non-activated instant-winner lottery ticket.

Promotional Features

A benefit to the lotteries of implementing the computer-activated instant lottery ticket includes the ability to provide promotional discounts and gifts (e.g. theatre discounts, consumable product discounts, rapid rewards, etc.) and advertisement. The ability will exist because of the connectivity to the central computer that can provide software programs to run such promotional programs.

Pursuant to this invention, using conventional software, many discounts, rewards, and advertisements can be provided to the purchaser of the computer activated instant lottery tickets.

There are a number of methods the can be used for the transmission of the display of promotions and advertising as a result of the remote connectivity to computer terminals, which under this feature are likely to mostly be personal computers and mobile devices, but could include any type of computer terminal, including LTAPs, POS devices, enclosed vending machines, etc. One method for the display of promotions and advertising on the computer terminals could be through software programs run by the central computer. Under this method, the central computer could have access to a database established for such promotion and advertising with the data base obtaining its data from internal or external input. Alternatively (or in conjunction with a database), the central computer could be configured to communicate directly with external ad networks. An example of such an ad network is AdMob, which is Google's advertising platform for promoting and monetizing mobile applications. Under this method, the central computer could be configured as generally known in the art to have access to the AdMob site whereby it would obtain the promotion and advertising provided by the site for presentation ultimately on the computer terminals. Other similar ad networks include, but are not limited to, Airpush, InMobi, LeadBolt, MobFox, MoPub, RevMob, Smaato, Tapjoy, and Unity Ads. All the ad networks operate similarly in that an application would be created to remotely connect the particular ad network to the central computer in order for promotions and advertising to be transmitted. The central computer would then coordinate the transmission of the promotions and advertising provided from the database or external ad network to the computer terminals in conjunction with the visual presentation of the particular lottery games.

Another method for the display of promotions and advertising through this system could be through web applications on the computer terminals that could have direct remote connection to either a database or to ad networks that are separate and apart from the central computer that would display promotions and advertising in coordination with the presentation of the particular lottery game. Under this method, the computer terminals could be configured to allow the display of promotions and advertising from the external database and/or ad network in connection with the visual presentation of the particular lottery games. And, another method may include a hybrid of both central computer coordination and external data base or ad network coordination to either the central computer or computer terminals. There may be other methodologies that could provide for the transmission of the display of promotions and advertising as well. Ultimately, the method used would provide for the transmission of the visual presentation of promotions and advertising, which is more fully described below, on the computer terminals in conjunction with the visual presentation of the particular lottery games.

The promotions and advertising could be visually presented just about anywhere on the particular computer terminal displays and be prompted by just about any factor in connection with the particular lottery game. The lottery gaming system or particular lottery game could be designed to provide, within or around the visually displayed game play shown on the computer terminals, advertising and/or advertiser's images, and/or other promotional offerings that could be shown randomly, in a pre-set pattern, or at will, before, during, or after the game, based on one or more factors related to the game play, such factors include: time elements; stages of the game; winning or losing; the occurrence of certain events; the demographics of the location or player; and, the presentation of certain numbers, letters, symbols, caricatures, game pieces, and/or other images. In addition, the advertising and/or advertisers' images and/or other promotional offerings could add to, replace, overlay, and/or correspond with some of the numbers, letters, symbols, caricatures, game pieces, and/or other images that otherwise could be used for the particular game. The game could be any type of instant-winner lottery game, whether a progressive jackpot game or pre-determined jackpot game.

Generally, advertising has been unsuccessful in traditional gaming settings primarily because traditional gaming devices involve "rapid results" play whereby the player is provided results within a relatively short period of time in order to make the gaming machine economically viable by allowing the player to play as many games as possible (thereby spending as much money as possible). Unfortunately, short period of time play makes advertising impractical since very little money can be made from advertising for such short period of time. Further, most players do not want to be distracted by advertising when paying for the chance to win on a traditional gaming device. And, gaming providers make far too much money from gambling play too worry about distracting players in order to make comparatively immaterial amounts of advertising revenue. The current system solves those problems.

Our system and method provides for the unique ability to display instant-winner lottery games via an intranet or Internet or any remote communication means on computer terminals that are non-gambling devices (i.e. devices created primarily for non-gambling activities—such as mobile devices, PCs or result terminals) yet be purchased or acquired in separately. Under this system, since a player would be essentially watching the unfolding of play results at their leisure on his/her device (and, therefore, likely to be performing other activities while using the device), they are less likely to be annoyed by promotions and advertising, which are customary on such devices, than they would otherwise be on a conventional gaming device in a conventional gaming setting. Further, since the system and method allow for game results to be displayed on non-gambling devices, which do not require "rapid result" games for economic viability, the system provides the ability for the unfolding of digitally displayed play results at the terminals over an extended period of time in an entertaining fashion (our unique "Extended View" feature) and for the effective display of advertising and/or advertising sponsors and/or promotional features within or around the play results, which can be designed into the lottery system, in the particular lottery game, or in the display features as responses to particular factors relating to or in conjunction with the game. The Extended View feature prolongs the visual presentation of the play results in an entertaining fashion with visual effects and/or varying game stages over extended lengths of time in order to provide a media that is more economically viable for the integration of promotions and advertising.

For the promotions and advertising feature, the ticket displays could also be virtually shown on the computer terminals, rather than at physical locations, with the visual identification markings shown to allow selection of the tickets for purchase. The computer terminals could be adapted to receive the uniquely identifiable code from a physical ticket or a virtual ticket, and then display a uniquely identifiable machine-readable and/or human readable code that can be used for the purchase of such instant-winner game via the computer terminal and/or at a point of sale device. This methodology would be especially adaptable to non-activated tickets that can be grasped by a player at a physical location from a display and then activated and purchased at a computer terminal, or at any POS device, although the methodology would be available to all types of instant winner lottery tickets.

Also, this feature is intended to cover "intangible" types of product giveaways (e.g. provide more "power play" to players of video games). The example of "power play" to players of video games is used because video game play is a multi-billion dollar market, whereby players play against each other and against the computer. In order to win many of these games, the players must achieve certain objectives and obtain "power" (in the form of shields, weapons, skill, etc.).

The players can be enabled to obtain such "power" from lottery ticket purchases. This would give them an incentive to purchase lottery tickets, while promoting the game. This would provide advertisement for the game providers and incentives for lottery purchases, thereby creating a win-win economic relationship for the lotteries and game providers. The type of intangible benefits will become apparent to many companies once the present system is implemented by lotteries.

These intangible benefits would not only be available to video game providers, but to airlines, retail stores, restaurants, travel entities, governments, and others.

Game Tickets

Although the game tickets described above are useful and will be found beneficial in many circumstances, in accordance with the present invention, additional tickets useable in the present invention are shown in FIGS. 14 through 20.

Figure 14:
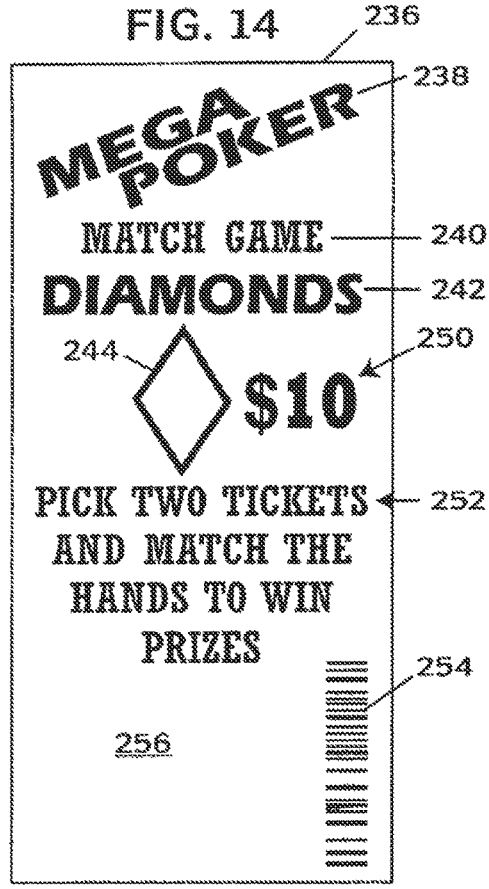
FIGS. 14, 15, 16 and 17 are front elevation views of full or partial tickets used in a two-ticket poker matching game in accordance with the present invention.
Figure 15:

FIG. 14 shows a ticket 236 for use in a match game in which two tickets including the ticket 236 and a second ticket 266 shown in FIG. 15 are selected and purchased by the customer at the same time and entered sequentially as a two-ticket combination in which poker hands provided by each of the tickets are compared with one another to generate prizes. In addition, an optional progressive jackpot entry is provided for the two-ticket combination.

The first ticket 236 has a title "MEGA POKER" 238, a game description 240, a type of ticket "DIAMONDS" 242 which is merely a ticket name, and does not necessarily relate to the poker hands in the game, a DIAMONDS symbol 244, and a ticket price 250 of $10.

Instructions at 252 state "Pick Two Tickets and Match the Hands to Win Prizes" which explains the nature of the game.

A barcode 254 provides unique identification of the particular ticket, and, optionally, ticket play information in non-human-readable form.

The ticket has a substantial blank space 256 at the bottom intended to receive printing, although optionally, instead of printing on the ticket, printing could be provided on separate paper and/or visually displayed on a screen.

As stated above, the ticket shown does not have any game play information in human-readable form. In one embodiment of the ticket, there is no play information on the ticket in any form, and instead it is stored in the central computer and supplied when the ticket is purchased. Alternatively, the play data can be generated randomly instead of stored in the central computer. In another embodiment of the ticket, all the play information is provided on the ticket in machine readable form only.

The second ticket 266 has similar features including the title 268, the type of game 270, the name of the ticket 272, and a symbol 274 of a heart, and a price 276. The instructions 252 from the ticket 236 are repeated at 252 in ticket 266.

A barcode 278 uniquely identifies the ticket and, optionally, may contain ticket play data as well, as stated above.

Figure 16:
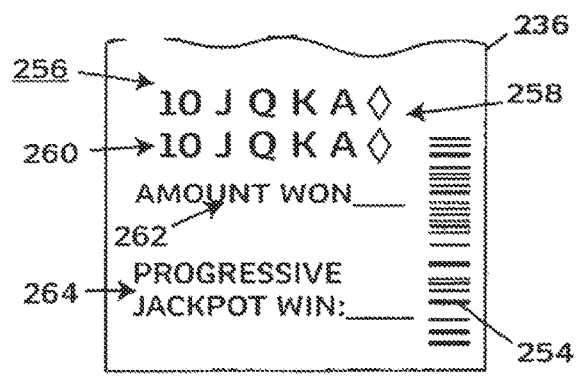

FIG. 16 shows play information 258 and 260 which is printed in the bottom portion of the ticket 236 shown in FIG. 16. In another embodiment, the play information is printed on separate paper instead of on the ticket and/or visually displayed on a screen.

Figure 17:
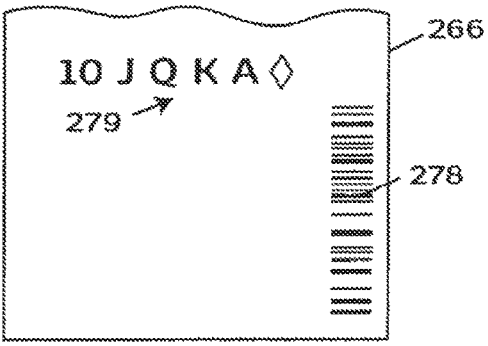

The play information 258 is taken from the ticket 266. FIG. 17 shows the bottom portion of the ticket 266 with the play information 279 printed on it.

FIG. 16 also has an optional space in which the amount won in the traditional game is printed at 262, and a further optional line 264 which indicates the winnings of the tickets in a progressive jackpot chance. In another embodiment, the amount won in the traditional game is not printed, but instead the instructions for the game, either provided at the displays, on the ticket, or otherwise provided by other means, provide the amount of winnings for the possible combinations.

In the central computer, there is stored identification of each of the tickets 236 and 266, and all other such tickets which have been distributed to distribution points. The tickets are not activated so that they can be displayed on racks such as the one shown in FIG. 1 of the drawings, and selected by a customer. The tickets are taken to the nearest LTAP or POS unit for purchase and scanning.

The central computer stores the information that each of the tickets must be paired with a second ticket for proper entry into the game. Therefore, when the first ticket has been entered, the computer waits for a second ticket to be entered before performing its tasks.

When both tickets have been entered, the central computer assigns a poker hand to each ticket, either randomly or by reading such a hand stored in the barcode 254 or 278. Then the poker hands 258 and 260 are delivered and printed on one or both of the tickets 236 and 266.

Alternatively, if it is preferred, the respective poker hands can be displayed on a screen or printed on a separate piece of paper, as if it were a receipt printed by the POS machine, and hand-delivered to the customer.

Upon verification and redemption of the prize, either of the two tickets can be submitted and read by the verification device and used to pay the winner. The central computer automatically voids the other ticket of the pair so that there is only one pay-out for the winnings on the pair of tickets.

This match game has the advantage of enabling the customer to match tickets of the same or two different types in a combination of his or her choosing.

It is noted that neither ticket 236 or 266 have an opaque coating over any human-readable game data, and, in fact, neither ticket has coating at all. This saves the cost of applying the coating and simplifies the ticket production.

If desired, play instructions on the reverse sides of the ticket (not shown) can give a table listing the winnings from the tickets, such as $1 million for two royal flushes in the same suit; $500,000 for two royal flushes of different suits; $10 for two pairs; $50 for a full house, etc.

If it is not desired to learn the winnings immediately, the determination of the outcome of the ticket can be deferred, in accordance with another one of the features of this invention disclosed above and below.

FIG. 18 shows another ticket 280 similar to each of the two tickets shown in FIGS. 14 and 15, except that it plays as a single ticket instead of a two-ticket combination. The ticket includes a name for the game 282, a description 284 of the game, a diamond symbol 286 to identify the ticket, the price of the ticket 288, instructions 294 playing the game, a barcode 292 which uniquely identifies the ticket and, optionally, includes encoded game play data. An open-space 296 is provided for receiving printing, although another embodiment would provide for the printing on a separate piece of paper and/or visually presented on a screen.

An optional feature 294 is accused expression for entertainment value, such as the expressions found in fortune cookies.

FIG. 19 shows the bottom portion 281 of the ticket 280 with two poker hands 298 and 300 printed on it, and the winning amount and optional progressive win printed in spaces 302 and 304.

The play of the game shown on the ticket 280 in FIGS. 18 and 19 are similar to the game played with the ticket combinations shown in FIGS. 14 and 15. For example, the poker hand 298 is jack, 9, 7, 7, king. The poker hand 300 is queen, 10, 7, 9, 4. In one exemplary game, the numbers and symbols from each of the two hands are combined to provide the best poker hand which, in this case, is a full house consisting of three 7's and two 9's.

Gift and Internet Play Tickets

Another ticket in accordance with present invention is shown at 306 in FIG. 20. The name of the ticket is shown at 308. The type of ticket is shown at 310, and, at 312, the price of the ticket is shown in dashed outlines. This is to indicate that the showing of the price on the ticket is optional with the lottery, depending upon the perceived wishes of the customers.

The ticket 306 is particularly adapted for sale as a gift given by a purchaser to another person. The gift recipient can check the game results remotely on a PC, laptop, smart phone or other mobile device and later turn the ticket in for the prize. The ticket 306 is also adapted for sale for Internet play for those players desiring to have the outcome determination of the ticket be provided on a PC, laptop, smart phone or other mobile device. By allowing the outcome determination to be provided on such devices, second chance play, extended play and simulated game features can be provided.

Since some players will not wish to list the price of the ticket on the ticket in order not to tell the recipient the cost of the gift, the gift receiver may or may not know this information when seeking to determine the results of the ticket in the lottery, but he or she has no need to know.

The barcode 316 contains a unique ticket identification code, with or without part of the game data for playing the game. The central computer can supply one or two random numbers or symbols to be matched with one another in the traditional game, and in the progressive jackpot game.

The ticket 306 differs from other tickets in that it has a unique identification number in human-readable form at 318. The particular number shown there is "7-9-1-6-3-7-2."

The gift recipient or the original customer, when checking to determine the winnings of the ticket on a PC, laptop, smart phone or other mobile device, can input that number and receive the information over the Internet in a system in which the Internet is legally available for such use.

The gift recipient or original customer, if he or she has won any prize, can take the ticket to a lottery location and redeem it in the usual manner.

If desired, instead of a price on the ticket at 312, the word "GIFT" can be listed and the price can be listed on the display rack or elsewhere. The ticket then is special and bears a code that, when read by a LTAP POS or other device, inhibits the equipment from giving the game results, and they will not be printed or otherwise disclosed until later accessed.

FIG. 21 shows a series of displays that can be made to appear on the display screens of the LTAP machine or POS station, or alternative station 116 (FIG. 7) which can be provided to facilitate the proper processing of tickets intended to be gifts.

At 320 is shown the first screen which says, "Insert Ticket" as it would appear on one of the LTAP machine screens such as that shown in FIG. 2.

After the ticket has been inserted, there would appear as shown at 322, the message "Insert Payment."

When payment has been received, the next screen would appear stating, "Show Results," either now or later. The user of the LTAP or the operator of the POS device indicates whether the customer wishes to be told the results of the game now or later, simply by touching one of the spots provided on the touch screen of the display.

If the indication is that the customer does not wish to know the results now, the "Take Ticket" message appears as shown at 330.

If the customer opts to receive the results immediately, the screen appears showing the outcome determination and winnings, optionally, if any, as shown at 326.

Next, any results of the jackpot drawing are shown as indicated at 328. If this information is to be printed on the ticket, it would be printed at this time, and the "Ticket" message would instruct the customer or clerk to remove the ticket and proceed accordingly.

If the customer opts to receive the results later, the customer or gift recipient would take the ticket(s) and obtain the outcome determination via a PC, laptop, smart phone or other mobile device as previously described.

The above description of the invention is intended to be illustrative and not limiting. Various changes or modifications in the embodiments described may occur to those skilled in the art. These can be made without departing from the spirit or scope of the invention.

What is claimed is:

1. An instant-winner lottery ticket system comprising:
   a. a central computer programmed to communicate via an intranet, the world-wide web and/or any remote communication means and a plurality of computer terminals located at one location or a plurality of spaced-apart locations capable of entering into a communication network with said central computer;
   b. a plurality of displays each having one or a plurality of instant-winner lottery tickets, said tickets displaying visual identification markings of one or a plurality of instant-winner lottery games available in said system to allow selection of said tickets for purchase, and each of said tickets bearing, in machine-readable and/or human readable code, information uniquely identifying said ticket;
   c. at least one of said computer terminals with a digital display screen, or adapted to communicate with a screen or screens capable of showing digital displays;
   d. at least one of said computer terminals having a communications device for sending signals corresponding to said identifying code to said central computer; and
   e. said central computer being programmed to receive said coded information and verify the identity of each ticket as one having been issued in said system and conduct one or a plurality of said lottery games with at least one fixed jackpot prize that is not pre-designated to a particular ticket.

2. A system as in claim 1 where at least one of the said fixed jackpot prizes is replenished after being won so that the at least one of the said fixed jackpot prizes can be won again by additional play in the said instant-winner lottery ticket system.

3. A system as in claim 1 where at least one of said fixed jackpot prizes is determined randomly or in some other methodological fashion, which does not pre-designate a particular ticket.

4. A system as in claim 1 wherein the plurality of displays include virtual digital displays, showing said instant-winner lottery tickets virtually and displaying said visual identification markings to allow selection of said tickets for purchase.

5. A system as in claim 1 in which the lottery gaming system or particular instant-winner lottery game provides within or around the visually displayed game play shown on the computer terminals, advertising and/or advertiser's images, and/or other promotional offerings that can be shown randomly, in a pre-set pattern, or at will, based on one or more factors related to the game play, such factors include: time elements; stages of the game; winning or losing; the occurrence of certain events; the demographics of the location or player; and, the presentation of certain numbers, letters, symbols, caricatures, game pieces, and/or other images.

6. A system as in claim 1 in which at least one of the said lottery games includes an extended view feature in which the gaming system or particular game is designed to provide entertaining visual effects and/or game stages that prolong the visual presentation of the game results over an extended length of time in order to provide a media better adaptable for additional promotions and advertising.

7. A system as in claim 1 in which at least one of said computer terminals, after receiving the uniquely identifiable code from a said ticket, is adapted to display a uniquely identifiable machine-readable and/or human readable code that can be used for the purchase of such instant-winner game via said computer terminal and/or at any point of sale device.

8. A system as in claim 1 in which said computer terminals include one or more of anyone of the following devices: remote personal and laptop computers, mobile phones and devices, and other internet communicable devices.

9. A system as in claim 1 in which the instant-winner lottery ticket system or particular lottery game is designed to provide for games adaptable for the display of advertising, and/or advertiser's images, and/or other promotional offerings within the game.

10. A system as in claim 1 in which extended play, second chance play, and/or other similar type games, including social gaming, are provided.

11. A system as in claim 1 in which extended play, second chance play, and/or other similar type games, including social gaming, are adaptable to provide for the display of advertising, and/or advertisers' images, and/or promotional offerings, including merchandise promotions, and/or cross-marketing coupons and/or other messages offering values and/or discounts for purchase on said computer terminals.

12. A system as in claim 1 in which prizes and rewards are provided from advertisers and/or game sponsors.

13. A system as in claim 1 in which at least one of said computer terminals is a POS device and/or a cash register and/or ancillary device connected to or associated with a POS device and/or cash register.

14. A system as in claim 1 in which at least one of said displays are in enclosed vending machines, and representations of the tickets are visible through windows, and said code reader and communication device are accessible from outside of said vending machines to receive and/or read said tickets.

15. A system as in claim 1 in which at least one of said displays present non-activated tickets, said code reader and communication device being adapted to activate each of said tickets.

16. A system as in claim 1 in which one or a plurality of computer terminals has a display means for displaying jackpot win/loss information and/or advertising information on a surface selected from the group consisting of:
 a. said ticket;
 b. a separate document; and
 c. a visual display device.

17. A system as in claim 1 in which said computer terminals are located in a single location or in a plurality of locations within a wide area selected from a subdivision of or a whole city, state or one or more countries.

18. A system as in claim 1 in which said lottery tickets are tickets covered with a scratch off material that when scratched reveals information (referred to as scratch-off tickets), tickets covered with material that when removed reveals information (referred to as pull-tab tickets), tickets that have no covering (referred to as inactivated tickets), and/or other variety of tickets that are designated for instant win play.

19. A system as in claim 1 in which said central computer is the internet cloud.

20. An instant-winner lottery ticket system comprising:
 a. a central computer programmed to communicate via an intranet, the world-wide web and/or any remote communication means and a plurality of computer terminals located at one location or a plurality of spaced-apart locations capable of entering into a communication network with said central computer;
 b. a plurality of displays each having one or a plurality of instant-winner lottery tickets, said tickets displaying visual identification markings of one or a plurality of instant-winner lottery games available in said system to allow selection of said tickets for purchase, and each of said tickets bearing, in machine-readable and/or human readable code, information uniquely identifying said ticket;
 c. at least one of said computer terminals with a digital display screen, or adapted to communicate with a screen or screens capable of showing digital displays;
 d. at least one of said computer terminals having a communications device for sending signals corresponding to said identifying code to said central computer;
 e. said central computer being programmed to receive said coded information and verify the identity of each ticket as one having been issued in said system and conduct one or a plurality of said lottery games with a progressive jackpot prize;
 f. said instant winner lottery tickets include tickets covered with a scratch off material that when scratched reveals information (referred to as scratch-off tickets), tickets covered with material that when removed reveals information (referred to as pull-tab tickets), tickets that have no covering (referred to as inactivated tickets), and/or other variety of tickets that are designated for instant win play.

* * * * *